United States Patent
Smushkovich

(10) Patent No.: US 7,420,287 B2
(45) Date of Patent: Sep. 2, 2008

(54) INTERMITTENT FORCE POWERED ELECTROMAGNETIC CONVERTERS ESPECIALLY FOR SEA WAVES

(76) Inventor: Aleksandr Smushkovich, 305 Bay 20th St., Brooklyn, NY (US) 11214

( * ) Notice: Subject to any disclaimer, the term of this patent is extended or adjusted under 35 U.S.C. 154(b) by 118 days.

(21) Appl. No.: 11/391,982

(22) Filed: Mar. 28, 2006

(65) Prior Publication Data

US 2007/0228736 A1    Oct. 4, 2007

(51) Int. Cl.
F03B 13/20    (2006.01)
H02P 9/04    (2006.01)

(52) U.S. Cl. .......................................... 290/42; 290/53

(58) Field of Classification Search ................... 290/43, 290/53, 42; 415/7; 60/398, 501; 416/7, 416/85
See application file for complete search history.

(56) References Cited

U.S. PATENT DOCUMENTS

| | | | | |
|---|---|---|---|---|
| 3,696,251 | A * | 10/1972 | Last et al. | 290/53 |
| 3,783,302 | A * | 1/1974 | Woodbridge | 290/42 |
| 4,260,901 | A | 4/1981 | Woodbridge | |
| 4,539,485 | A * | 9/1985 | Neuenschwander | 290/53 |
| 5,696,413 | A * | 12/1997 | Woodbridge et al. | 310/15 |
| 6,020,653 | A * | 2/2000 | Woodbridge et al. | 290/53 |
| 7,141,888 | B2 * | 11/2006 | Sabol et al. | 290/53 |
| 7,164,212 | B2 | 1/2007 | Leijon et al. | |
| 7,168,532 | B2 * | 1/2007 | Stewart et al. | 188/161 |
| 7,304,399 | B2 * | 12/2007 | Leijon et al. | 290/42 |
| 7,323,790 | B2 * | 1/2008 | Taylor et al. | 290/42 |
| 2002/0145288 | A1 | 10/2002 | Breems | |
| 2003/0020281 | A1 | 1/2003 | Beal | |
| 2007/0040384 | A1 * | 2/2007 | Bernhoff et al. | 290/42 |

FOREIGN PATENT DOCUMENTS

| GB | 2338839 | 12/1999 |
|---|---|---|
| JP | 55160967 A | * 12/1980 |
| JP | 06280733 A | * 10/1994 |

* cited by examiner

Primary Examiner—Julio Gonzalez

(57) ABSTRACT

Converters and method for intermittent forces energy conversion into electric power and damping excessive forces are presented. The converters employ various exemplified electromagnetic controllable transducers comprising multi-magnets inductors and multi-teeth armature, transforming sea wave's and wind's motion into electricity; base, impelling, and control means. The transducers are combinable with means translating the motion into linear, revolving, swinging movements. Transducer's cooling subsystems are exemplified. The base means are described, including fixed, floatable, and containing virtual vessels of variable parameters and expandable extensions. The impellers include floatable, fixed, adjustable. The control means include sensors measuring wave's and converter's parameters; control units adaptively regulating electric power production, and absorbing the excessively powerful waves' energy, depending on their changing parameters. Stabilizer-generators for base means are disclosed, comprising chambers fillable with rotating water pumped in during storms, then recuperating the rotational energy into electricity through MHD-generators. Some converters include electrolyzer hydrogen production and storage means.

12 Claims, 12 Drawing Sheets

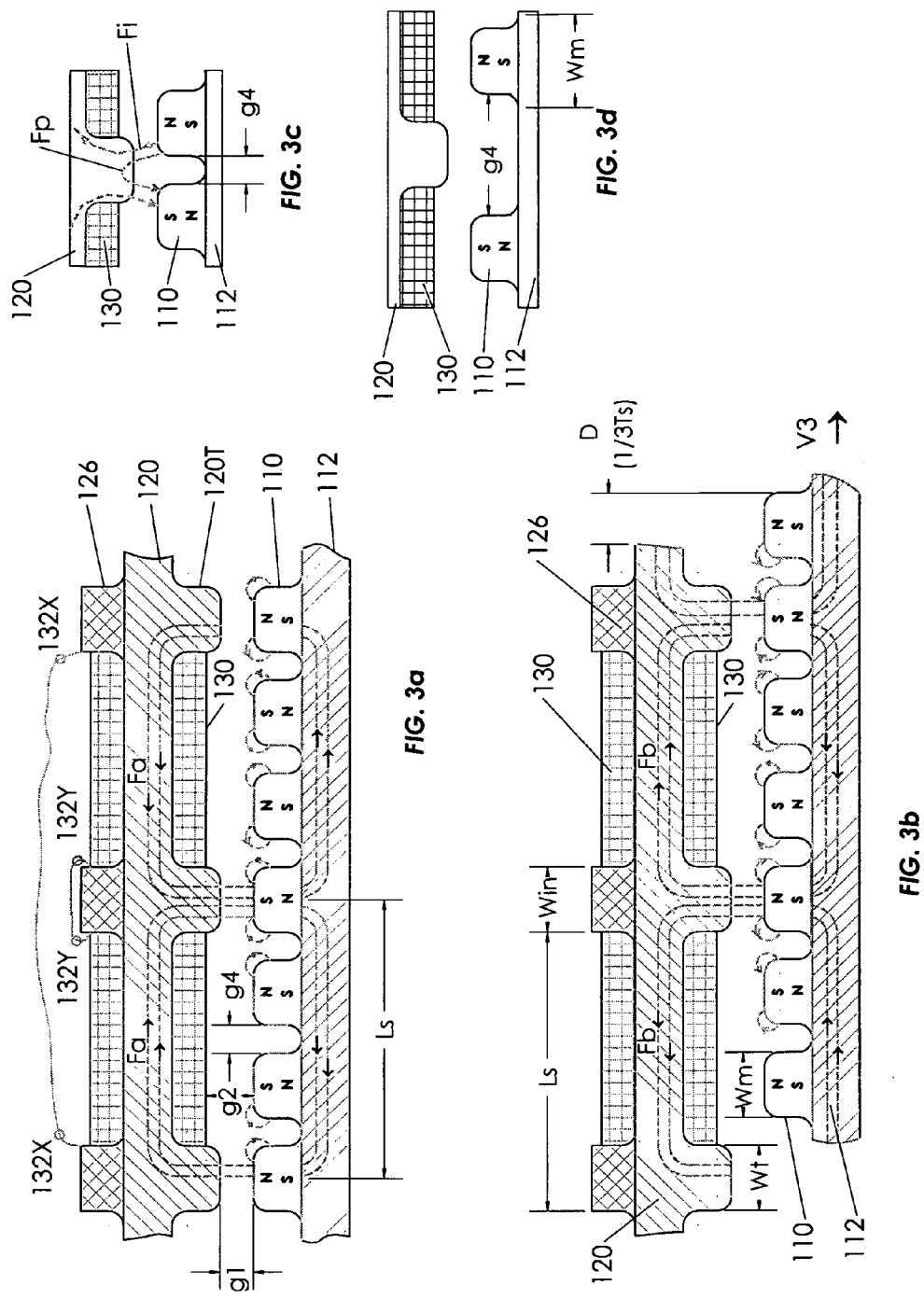

INTERMITTENT FORCE POWERED ELECTROMAGNETIC CONVERTERS ESPECIALLY FOR SEA WAVES

TECHNICAL FIELD

The present invention relates to devices and methods for power generation through conversion of energy, possessed by intermittent mechanical forces, e.g. caused by sea or ocean waves, winds, etc., into electrical energy, which may further be used, for example, for hydrogen production.

BACKGROUND OF THE INVENTION

For the last several years, the importance of non-traditional renewable and pollution free energy sources is constantly increasing. The global warming effect with its possible relations to people's industrial activities, the rapidly rising demand in oil products in conjunction with the depletion of natural oil resources, environment pollutions caused by burning coal and other hydrocarbon fuels in power stations and in engines of transportation means, and, on the other hand, by highly radioactive waists produced by nuclear reactors, environment alterations caused by many traditional dam hydroelectrical power stations, all together result in acceleration of research and development of solar, wind, thermal, tidal, sea wave and other renewable, clean, and environment friendly energy sources.

Besides, the "oil addictiveness" of industrial and some developing countries leads to political tensions between and inside nations and religions, often being a major contribution in initiating wars, war conflicts, and terrorism. Therefore, it makes the wide use of renewable energy sources (all based on unequal heating of different parts of the earth by the sun's radiation) even more important and desirable. Accordingly, there are many engineering solutions dedicated to development of these sources.

The potential of these energy sources is tremendous. Particularly, as mentioned in U.S. Pat. No. 6,857,266, the size of ocean wave energy only along the coasts of the European Union is estimated to be 219 Gigawatts. Wave energy converters (WECs) with installed capacities of one Megawatt and greater are developed. That patent differentiates three categories of WECs, depending on their location in the sea: "onshore", "near shore", "offshore". It generally proposes a system of at least two devices: a float and a submerged body adapted to move relative to one another in response to passing waves in the body of liquid, and this relative movement may be harnessed by the linkages between the at least two devices. The system also has a capability to entrap volumes of the surrounding liquid thereby changing hydrodynamic balance associated with a so-called "added mass". The linkages are adapted to operate a typically hydraulic power take off system driving an electric alternator.

Meanwhile, it mentions a British patent GB 1587344, which presented an idea "to force the phase of a heaving float to follow that of the waves, which had a significantly lower natural frequency (longer period). In this way greatly amplified motions and correspondingly larger power levels were achieved. They disclose the holding of the heaving body at the top or bottom of its cycle by a hydraulically operated latching mechanism (functioning as a parking brake), locking the heaving float to a long rod attached to the bottom of the wave channel. It was then released so that it would resume motion in direction and in phase with the wave. Further theoretical analysis has been completed by various researchers. Two forms of such 'phase control' are now recognised, i.e. latching as described and continuous control which may be applied throughout the cycle and may involve power being returned to the heaving device."

According to the same U.S. Pat. No. 6,857,266, "the apparatus may additionally comprise latching and/or phase control means adapted to assist and optimise the oscillation, amplitude and relative motion of linked devices in varying or heavy sea conditions. This may be effected by using hydraulics or air springs to freeze or temporarily dampen the movements of the devices and or to return power to the apparatus at certain stages in the cycle. The apparatus may also include mooring systems that maintain the complete apparatus in a position that is consistent with statutory requirements and not significantly inhibit its efficient operation. In addition to the aforementioned power take-off linkages, linked devices may also have elastic links or chains or shock absorbers or similar adaptations to absorb excessive relative movements in heave or surge or pitch that may be caused by breaking seas in storm conditions; such elastic links or chains would normally be slack and may be weighted."

It thus becomes possible to adapt the movement of the float to resemble the wave motion, and to more effectively convert the wave energy into mechanical energy of the float by means of deceleration (braking) and acceleration (releasing) of its movement at predetermined moments of the cycle (phase) with predetermined forces. Both patents: U.S. Pat. No. 6,857,266 and GB 1587344 are herein entirely incorporated by reference.

Another U.S. Pat. No. 6,812,588, hereby also entirely incorporated by reference, describes a WEC selectively adjustable in length, utilizing a downward gravitational force to discharge fluid from a piston assembly connected to a floatation device, which fluid drives a hydraulic power generator that can be used to produce electric energy.

U.S. Pat. No. 6,768,217 describes a WEC comprising a tube vertically movable relative to an anchored float, which tube is reciprocating in response to overpassing waves and driving a transducer for energy generation. The WEC also comprises a motion translator for reducing the transducer's stroke length and magnifying the force transmitted to the transducer, an energy buffer system for limiting the travel of the tube in response to excessively large surface waves, means for adjusting buoyancy in response to changing conditions, a pressure relief valve for automatically reducing excessive tube driving pressures. The U.S. Pat. No. 6,768,217 is also entirely incorporated by reference herein.

U.S. Pat. No. 6,833,631 teaches a vertically extended floating inner member linearly movable relative to an outer member. The relative movement is associated with a relative motion of coils and magnets to generate electrical current, which supplies electrical power for deep-water hydrogen generators in which water is electrolyzed to generate compressed hydrogen gas. This patent disclosure is entirely incorporated by reference herein.

U.S. Pat. No. 4,151,423 discloses a magnetohydrodynamic electric generator for direct energy conversion of saline water kinetic energy flowing through a magnetic field and a sea platform containing a multitude of electricity generators to maximize such conversion. This patent is also incorporated by reference in its entirety.

U.S. Pat. No. 6,515,375 teaches an adaptive wave motion electrical generator comprising wire coil and magnet structure movable relatively to each other and generating electric current. The generator is capable to measure dynamic parameters (relative acceleration, velocity and displacement between the structures) as well as magnitudes of the current and voltage across the coil structure, and the amount of the current is controlled based on the dynamic parameters. The description of U.S. Pat. No. 6,515,375 is hereby entirely incorporated by reference.

There are other several known solutions related to the problems that the present invention concerns with. For instance, U.S. Pat. No. 5,818,132 to Konotchick describes "a linear motion electric power generator for generating electric current from work done by an intermittent force. A moving magnet is confined so that it can move with bidirectional linear, or approximately linear, motion through each of at least two coils. The coils are spaced apart from each other and connected electrically so that the current produced in a first coil as a result of movement of the moving magnet is substantially in phase with current produced in said second coil." So, a major feature of Konotchick's invention is the movement of magnet(s) inside at least two coils producing, as taught, electric current more efficiently, due to a special distance between the coils and a special way of the coils connection.

Another example of a linear generator based on movement of magnets inside of an inner space of conductive coils is shown in U.S. Pat. No. 6,798,090 to Cheung et al. Its major difference from Konotchick is that it arranges two neighboring moving magnets in opposite polarity, which, according to Cheung, allows intensifying the magnetic flux density in the proximity of the coils. Thus, both inventions utilize the well-known principle of electromagnetic induction resulting in an electric current being inducted in a conductive coil enclosing inside permanent magnets moving relatively to the coil. The faster the magnets move, the greater the electric current is.

Similarly, U.S. Pat. No. 6,921,983 teaches an electric generation device comprising a free flowing magnet and wire coils that capture electrons as the magnet is moved, and transmit the electrons to a diode bridge. The device allows to convert the natural turbulence of a free body of water into AC or DC electric power. According to that patent, it is possible to use a plurality of such generators to form a larger power generating grid.

Analyzing Konotchick in another U.S. Pat. No. 6,952,060 to Goldner et al, hereby entirely incorporated by reference, its authors noticed, that "the reported mechanical and electrical energy conversion for the total generator unit were relatively low, ranging from 2.7 to 4.8%." Further, Goldner teaches an electric generator and regenerative electromagnetic shock absorber which converts variable frequency repetitive intermittent linear displacement motion to useful electrical power. It provides for superposition of radial components of the magnetic flux density from a plurality of adjacent magnets to produce a maximum average radial magnetic flux density within a coil winding array. It also states that "due to the limitations of current linear motion energy generator devices, it would be advantageous to provide an efficient, variable frequency, regenerative, linear electromagnetic generator with high power generating capacity and high energy conversion efficiency." It is believed that this statement is still actual.

While the structural arrangements of the above described and many other devices, at first appearance, have similarities with the present invention, they differ in material respects. These differences, which will be described hereinafter, are essential for the effective use of the present invention and which admit of the advantages that are not available with the prior art devices and methods.

BRIEF SUMMARY OF THE INVENTION

One of the aims of the present invention is to provide various exemplary constructions of a transducer capable to efficiently and adaptively transform intermittent reciprocating motion, such as caused by sea waves, winds, etc. into electrical power.

Another aim is to show examples of a cooling system for such a transducer driven by the wave motion.

Another aim of the invention is to provide various exemplary embodiments of efficient wave energy converters (above-water and under-water) utilizing said transducer, which converters may optionally be used for production of hydrogen from seawater.

Another aim of the invention is to provide various base means, including floatable platforms with variable properties, for the wave energy converters.

Another aim of the invention is to provide various impelling means, including floatable and non-floatable, for the wave energy converters.

Another aim of the invention to demonstrate different translating means capable to transform various types of movement of the impelling means into rotational, swinging, and linearly reciprocating movements driving the transducers.

Another aim of the invention is to provide control means for adaptive regulation of electric power produced by said converters, and absorbing the energy of excessively large waves, depending on changing parameters of the sea waves.

Another aim of the invention is to demonstrate different combinations of such transducers and converters employed in the on-shore, near-shore, and offshore installations.

Another aim is to provide stabilization-generation means capable to stabilize the position and minimize the deviation of floatable base means, accumulate energy of excessively strong storm waves, and recuperate this energy, e.g. after the storm, for use in an electrical load circuitry.

Other aims of the invention will become apparent from a consideration of the drawings, ensuing description, and claims as hereinafter related.

The aforementioned aims are achieved by providing converters for conversion of intermittent forces' energy into electric power, and damping excessively large waves. The converters employ various exemplified electromagnetic controllable transducers comprising multi-magnets inductors and multi-teeth armature, transforming sea wave's and wind's motion into electric power. The transducers are combinable with means translating the motion into linear, revolving, swinging movements. Accordingly three basic assemblies types are introduced: linear, annular, and annular segment types. Transducer's cooling subsystems are exemplified; one of them includes a heat exchanger.

The converters comprise base means, including fixed, floatable, and containing virtual vessels of variable parameters and expandable extensions. The converters also comprise impellers, including floatable, fixed, and adjustable. The converters comprise control means, including sensors devices, measuring wave's and converter's parameters, and control units, adaptively regulating electric power production and absorption of the excessively large waves' energy, depending on their changing parameters. Stabilizer-generators for base means are disclosed, comprising chambers fillable with rotating water pumped in during storms, then recuperating the rotational energy into electricity through MHD-generators. Some converters include electrolyzer hydrogen production and storage means.

BRIEF DESCRIPTION OF THE DRAWINGS

FIG. 3a and FIG. 3b are schematic partial sectional views of an IWET with an armature moving relatively to an inductor according to another embodiment of the present invention.

FIG. 3c and FIG. 3d are schematic sectional views of fragments of the inductor and the armature of the IWET illustrated on FIG. 3a and FIG. 3b.

FIG. 5b is a schematic side sectional side view of the underwater pendulum IWEC, according to the embodiment of the present invention shown on FIG. 5a.

FIG. 6b is a sectional side view of the floating platform-based pendulum IWEC, employing the pendulum IWET, according the embodiment of the present invention shown on FIG. 6a.

FIG. 7b is a side sectional view of the rack gear mechanism and a rotational IWET, employed by the vertically reciprocating IWEC, according to the embodiment of the present invention shown on FIG. 7a.

FIG. 8b is a frontal sectional view of the two-sectional vertical linear reciprocating MSL-IWET, according to the embodiment of the present invention shown on FIG. 8a.

FIG. 8c is a partial sectional view of the lower part of a modified two-sectional vertical linear reciprocating MSL-IWET with a heat exchanger, according to an embodiment of the present invention.

FIG. 12b is an isometric view of the IWSG, according to the embodiment of the present invention shown on FIG. 12a.

FIG. 12c is a sectional view of the IWSG with an MHD-unit, according to the embodiment of the present invention shown on FIG. 12a.

In general, similar reference numerals point to similar elements of different embodiments on the drawings.

Figures 1A, 1B:
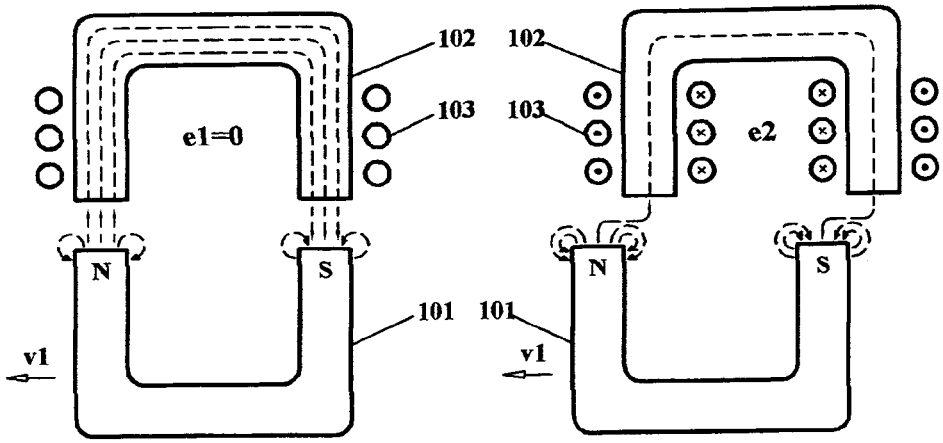
FIG. 1a and FIG. 1b are schematic views of a U-shaped permanent magnet interacting with a U-shaped core with a coil wound around the core, moving relative to the magnet.

Some Abbreviations Used in The Description:
IWET—Inventive Wave Energy Transducer;
IWEC—Inventive Wave Energy Converter, may include an IWET, or IWETs;
MSL-IWET—Multi-Sectional Linearly Reciprocating IWET;
IWECS—Platform-Based IWEC System;
MP-IWECS—Multi-Platform IWECS, may include a plurality of IWECSs;
IWSG—Inertial Water Stabilizer-Generator;
MHDU—Magnetohydrodynamic Unit.

DESCRIPTION AND OPERATION OF THE INVENTION

While the invention may be susceptible to embodiment in different forms, there is shown in the drawings, and will be described in detail herein, a number of specific embodiments of the present invention with their implementations and modifications, with the understanding that the present disclosure is to be considered an exemplification of the principles of the invention, and is not intended to limit the invention to that as illustrated and described herein.

Basic Concept of the Inventive Wave Energy Transducer (IWET).

As noted above, U.S. Pat. Nos. 5,818,132 and 6,798,090 disclose power generating devices based on a linear movement of permanent magnets, caused by an intermittent force, inside conducting coils. The sizes, relative distances between the magnets and coils, and the way of connections between the coils are so arranged in those constructions that the phase of current in a first coil is about equal to the phase of current in a second coil, which makes the generation more efficient, as stated by the authors. Since the overall magnetic field of all the magnets are unequal along the axial longitudinal direction that is the direction of magnets movement, these unequal spots are registered by the coil enclosing the magnets. The main portion of the magnetic flux associated with the magnets, however, is not associated with the coil, but remains in the immediate proximity of the magnetic poles. This causes the low efficiency of such generators or transducers.

U.S. Pat. No. 6,952,060 discloses an electromagnetic generator/shock-absorber device primarily modeled and designed for relatively small amplitudes of vertical reciprocating appropriate for motor vehicles movements, and does not seem to provide high efficiency of ocean wave energy conversion. Besides, it does not describe suitable adaptive means, which might be capable to operatively change parameters of wave energy converters.

Most of other known WECs rely on conditional electrical generators or transducers employed in the final stage of the wave energy conversion, i.e. for producing electric power. Solutions involving magnetohydrodynamic generators so far also cannot provide high efficiency because of relatively low velocities of seawater motion.

The present invention provides another way for increasing the efficiency of electric power generation based on a reciprocal-linear or reciprocal-revolving movement of magnets impelled substantially by an intermittent outer force, such as created by sea waves, winds, etc.

Due to a special design and dimensional relations between construction elements, it can substantially provide the equality of currents phases in coils (or in one-phase coils groups) or conductive windings disposed on an armature of the IWET, wound around a core of the armature preferably made of soft iron, or a similar material preferably having a relay-type (or very narrow) hysteresis characteristic to avoid energy losses for re-magnetizing.

The IWET may operate without an intermediate gear or mechanism directly converting the mechanical power of ocean waves into electric power of a necessary voltage, or may optionally deploy such gears or mechanisms.

The IWET also provides means to absorb energy of excessive waves and simultaneously to benefit from them by converting that energy into additional electric power to be consumed by electrical load circuits.

Sea waves distinguish from most other conventional energy sources by their relatively low frequencies, intermittence, chaotic nature, wide range and low predictability of their amplitudes, frequencies, and directions. Hence, some solutions are dedicated to increasing the output WEC's frequency by means of hydraulic and other gears and other mechanisms, which afterwards mostly transmit the higher frequency motion to drive a conventional electric generator. Since the primary input wave movements are highly intermittent and almost unpredictably changing their amplitudes and frequencies, the conventionally designed electric generators often operate inefficiently in those WECs.

In contrast with the mentioned devices, the IWET is characterized in that the changes of magnetic flux associated with the coils are provided by continuous alterations of the magnetic state and polarity of the armature core's body, thereby inducing electromotive forces in the coils.

The magnetic state and polarity alterations are caused by successive approaching and withdrawing of a row of movable magnets, disposed on an inductor, to and from teeth of the armature core with conductive coils wound on it. The approaching and withdrawing are actuated by the intermittent outer force.

The movable magnets are preferably permanent magnets (though suitably configured electromagnets may also be utilized), and may be preferably made of rare earth magnetic materials or a combination of such materials with magnetic ceramics, as taught in U.S. Pat. No. 5,818,132 hereby entirely incorporated by reference.

Special configurations and size ratios of magnetic circuits for the flux circulation between two neighboring teeth of the armature core and two neighboring oppositely oriented magnets allow to achieve a dynamic reciprocation of inducted currents within the coils in response to changing of mutual positions of the magnets and the teeth.

An operation principle of the IWET is for simplicity demonstrated on FIGS. 1a, and 1b. They show an immovable conductive winding (103) wound on an U-shaped core (102) and a movable U-shaped permanent magnet (101) that is moving with a velocity (v1) in the transversal direction to core 102. Magnet 101 and core 102 are mutually disposed so that when magnet 101 fully approaches core 102, they together form a loop-like configuration as shown on FIG. 1a In the position reflected on FIG. 1a, core 102 is maximally satiated with the magnetic flux (shown on the drawings by dashed lines and small arrows). The induced electromotive force (EMF) is generally proportional to the derivative of the changing magnetic flux, and in winding 103 is indicated on FIG. 1a as (e1)=0. The successive relative position of magnet 101 and core 102 is depicted on FIG. 1b, with the corresponding induced EMF in winding 103 (e2)>0, and the lesser magnetic flux.

The induced current directions in winding 103 are illustrated by small circles containing an X-symbol for the current facing from the viewer, and a dot-symbol for the current facing toward the viewer, according to Fleming's rule. The relation between the EMF and induced current, particularly, depends upon characteristics of an electric load in the circuit of the induced current.

Figures 2A, 2C:
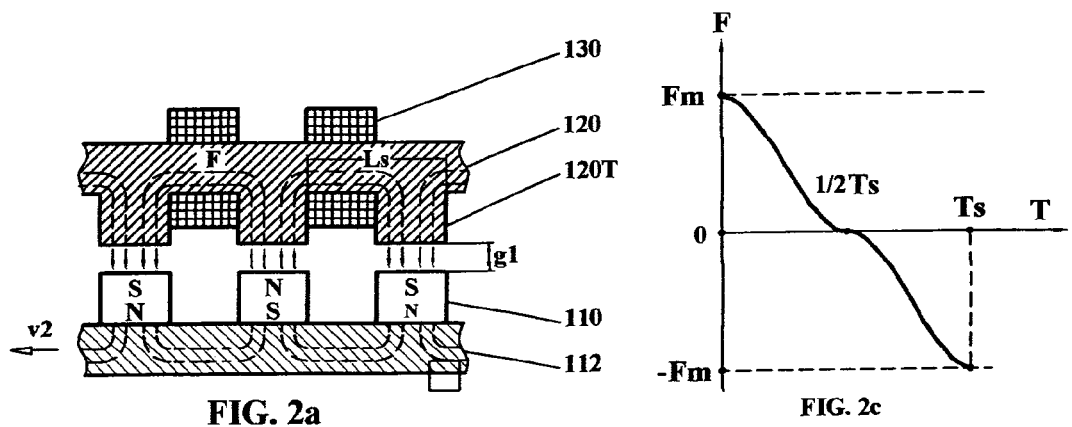
FIG. 2a and FIG. 2b are schematic partial sectional views of a linear reciprocating inventive wave energy transducer (IWET) with an armature moving relatively to an inductor according to an embodiment of the present invention.
FIG. 2c is a graph representing an exemplary magnetic flux as a function of time of the armature's movement of the IWET illustrated on FIGS. 2a and 2b.

FIG. 2a partially depicts an armature, comprising coils (130) wound on an armature core (120), with characteristics similar to core 102. Core 120 includes a plurality of teeth (120T), each having a tooth width (Wt). An armature step (Ls), shown on FIG. 2b, consists of the sum of a coil width (Wc) and the tooth width Wt. Core 120 may comprise laminated thin plates made of soft iron or a type of iron used in conventional transformers to suppress parasitic eddy currents.

An inductor, shown on FIG. 2a, comprises an array of permanent magnets (110), having similar characteristics to the ones of magnet 101, fixedly and linearly disposed on an inductor core (112), with an equal interval between each neighboring pair of magnets 110. Inductor core 112 has characteristics similar to the ones of core 102. Every two neighboring magnets 110 are positioned in the opposite polarity. Each magnet has a width (Wm), indicated on FIG. 2b. In this embodiment the width Wm is substantially equal to the width Wt.

The permanent magnets are preferably made of rare earth magnetic materials well known to a skilled artisan, but other less expensive magnetic materials may also be used, though would generally create a lower magnetic flux density. The inductor core is preferably made of a magnetic material with very a narrow hysteresis characteristic to avoid losses for re-magnetizing. If necessary to suppress parasitic eddy currents, it should be made of thin laminated elements assembled in an appropriate shape.

Figures 2B, 2D:
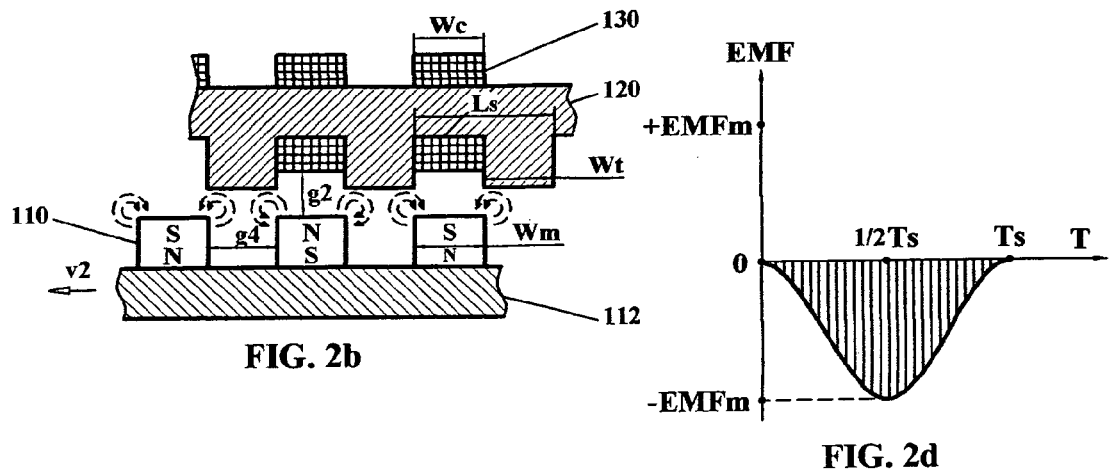
FIG. 2d is a graph representing an electro-motive force induced in coils of the armature of the IWET illustrated on FIGS. 2a and 2b.

FIGS. 2a and 2b illustrate magnetic flux (F) in core 120 and in core 112, it is equal to a maximum on FIG. 2a and is essentially equal to zero on FIG. 2b.

An air gap (g1) between tooth 120T and magnet 110 is indicated on FIG. 2a, and an air gap (g2) between the innermost part of coil 130 and the outermost part of magnet 110 is indicated on FIG. 2b. An air gap between two neighboring magnets (g4) is shown on FIG. 2b. The air gap (g1) should be much less than (g2) and (g4) to minimize losses of magnetic flux for mutual magnetic fields between pairs of neighboring magnets, and for parasitic eddy currents induced in the coil's external layer, when a magnet 110 transversely crosses the space under coil 130, separated by the air gap (g2), as depicted on FIG. 2b.

Example of Operation.

FIGS. 2a and 2b illustrate the changing positions of the inductor relatively moving along the armature with a velocity (v2), and the associated changes of the magnetic flux in both the cores.

For example, if the inductor core 112, shown on FIGS. 2a, 2b has ten magnets 110 (not depicted), the electric current in each coil 130 reciprocates (changes its direction to the opposite) ten times for one fill forward traveling of core 112 from the very right to the very left position towards the direction of (v2), plus ten times for the backward traveling of core 112 (when the velocity v2 changes its direction due to a sea wave reciprocating). That is the use of ten magnets in the inductor increases the reciprocating frequency of the intermittent input ten times in each coil.

If the beginning of a first coil 130 is connected with the end of a second (neighboring) coil 130 and the end of the first coil is connected to the beginning of the second coil, then currents in both coils have the same phase, and a frequency ten times higher than the input sea wave frequency.

FIG. 2c illustrates an approximate waveform of magnetic flux F in core 120 as a function of time T. At the moment when T=0, the moving inductor is situated in a position depicted on FIG. 2a, and the amount of flux is (Fm). FIG. 2b shows a corresponding position when T=½ Ts and the amount of flux is (−Fm). The time, during which the inductor's displacement is equal to armature step Ls, is indicated as (Ts), which position is not illustrated.

The first half-period of the Ts cycle (0-½ Ts) is shown on the graph of FIG. 2c as a positive half-wave, and the second half-period of the Ts cycle (½ Ts-Ts) is shown as a negative half-wave.

FIG. 2d illustrates the corresponding EMF waveform, which may be rectified to feed into an electrical load, as further discussed in the disclosure. The markings (+EMFm) and (−EMFm) on the graph respectively indicate the maximum positive and negative amplitude of the EMF.

In accordance with Neumann's law, an EMF in coil 130 is proportional to dF/dT, that is the derivative of the flux F associated with coil 130. For a coil, flux F is generally equal to B (flux density in a core cross-section) multiply by A (an area perpendicularly crossed by the vector F).

In the case of core 120 having a rectangular cross-section, area A may be determined as the product of the height of core 120 multiply by its thickness (W—not shown). An exemplary waveform of the flux F is shown on FIG. 2c.

The EMF is proportional to dF/dT that is to B (flux density in the air gap between the magnet and the tooth) multiply by v2 (the velocity of motion equals dX/dT, where X is the coordinate of the motion of core 120) multiply by W (core thickness) multiply by Nt (number of coil wire turns). Therefore, the EMF effective amount (of the function EMF proportional to dF/dT, illustrated on FIG. 2d) is proportional to the shadowed area on FIG. 2d divided by Ts (that is to the integral of the EMF-function taken from 0 to Ts divided by Ts).

An effective amount of an alternative current in a coil circuit is generally proportional to the effective amount of EMF for a given circuit load. Therefore, the electric power converted from the relative mechanical motion between the armature and inductor is generally proportional to the product of the effective amounts of the electric current and the EMF, that is to the squared amount of EMF, or to the squared amount of the shadowed area on FIG. 2d divided by Ts.

Thus, the greater the shadowed area is (or the more such shadowed areas, i.e. EMF pulses generated in a coil for a time interval), the more electric power is generated by the IWET.

A way to increase the EMF, i.e. the rate of change of the flux (dF/dT) is to increase the frequency of crossing each tooth 120T by magnets 110 (the number of shadowed pulses), while not changing the inductor's length and velocity (v2) dictated by the intermittent forces of waves. It is possible by means of reduction of the gap (g4) between the neighboring magnets, by making teeth 120T and magnets 110 narrower. This however would compel the designer to make the length of coil 130 shorter, and therefore to reduce the number of wire turns Nt in one coil, which would result in reducing the EMF of each coil, and hence increasing the number of coils. Therefore, in some cases, this may complicate the technology of making the armature, because the necessity of arranging more narrow teeth 120T and sequentially connecting more coils.

An IWET Having More Magnets than Teeth.

Figure 3E:
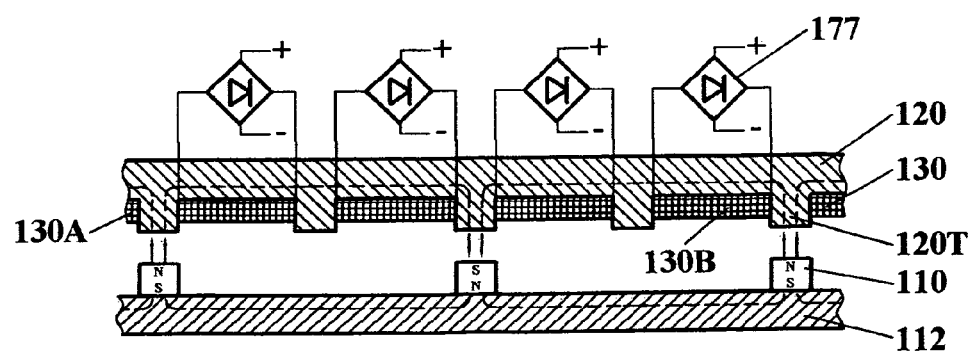
FIG. 3e is schematic sectional view of fragments of the inductor and the armature of an IWET, according to another embodiment of the present invention.

Referring to FIG. 3a, there is shown a partial view of another linearly reciprocating embodiment of IWET, which comprises an armature means including a plurality of coils (130) wound on a core (120), having a plurality of teeth (120T) disposed on the inner side of core 120 with equal intervals. Coils 130 are inner-wise separated by teeth 120T, and outer-wise separated by a plurality of isolative insertions (126), which also serve for fixing the armature within a casing (not shown on FIG. 3a, 3b). In this embodiment the insertion width (Win) is equal to the tooth width (Wt) as illustrated on FIG. 3b.

The embodiment of IWET comprises an inductor means including a plurality of permanent magnets (110) mounted on an inductor core (112) with equal intervals between each pair of neighboring magnets, and each two neighboring magnets are positioned in the opposite magnetic polarity. Inductor core 112 with magnets 110 are capable of a linear-reciprocating motion relatively to the armature, which motion is actuated by an outer intermittent force, for instance, created by sea waves.

The width of each magnet (Wm) equals to the tooth width (Wt) in this embodiment. An armature step length (Ls), consisting of the sum of the coil length in the longitudinal direction of the armature movement and the length of a tooth Wt, is shown on FIGS. 3a and 3b.

An air gap (g1), shown on FIG. 3b, between tooth 120T and magnet 110 should be made generally at least three times less than an air gap (g2) between magnet 110 and the innermost surface of coil 130. The air gap (g1) might generally be made at least nine times less than an air gap (g4) between two neighboring magnets for the above stated reasons indicated in the previous embodiment. These proportions between said air gaps may be changed depending on magnetizability of magnets 110 and peculiarities of a particular construction of IWET.

FIGS. 3a and 3b illustrate the changing positions of the inductor relatively moving along the armature with a velocity (v3), and the associated changes of the magnetic flux in both core 120 and core 112. FIG. 3b depicts the inductor displaced from the previous position (indicated on FIG. 3a) by a displacement (D), which is substantially equal to Wm. The operation processes in this embodiment are in general similar to the ones described for the previous embodiment.

In this embodiment, the number of teeth 120T, which can be accommodated by the armature step (Ls), may be 3 (as demonstrated on FIG. 3a, 3b), 5, 7, etc. It may not be an even number in this embodiment, since the flux cannot circulate through the armature core when two magnets with the same polarity are positioned under two neighboring teeth.

An excessively narrow gap (g4), as shown on FIG. 3c, may cause an increase of a parasitic flux Fp between two neighboring magnets 110, and decrease of the useful flux Fi associated with coils 130 that is responsible for creation of the EMF. On the other hand, an excessively wide gap (g4) is also undesirable (illustrated on FIG. 3d), since would lower the frequency of crossing teeth 120T by magnets 110, and reduce the effective EMF. The right choice of the gap (g4) in relation to the width of magnets Wm should be made by a routine experimentation for a particular construction.

An IWET Having More Teeth than Magnets.

Sometimes, it may be necessary to do the opposite, i.e. to increase the number of teeth 120T and coils 130, but reduce the number of magnets 110. This may be the case when expensive rear earth magnets are used in the device, and it may be needed to lower expenses. As illustrated on FIG. 3e, in such a case this may require to mount more coils 130 on armature core 120, and connect each coil with a rectifying bridge (177), and the number of teeth 120T is shown two times more than the number of magnets 110, disposed on inductor core 112. The frequency of the flux reciprocating in core 120 will be two times less than in the schema shown on FIG. 2a, 2b.

For example, if five magnets 110 are mounted on inductor core 112, it will require ten teeth 120T and ten coils 130 installed on armature core 120, and ten rectifying bridges 177. The bridges 177 may be connected in parallel and connected to the circuit load. The number of bridges 177 may be substantially reduced to only four, if the coils with the same phase (a one-phase coils group) are connected in parallel to only one bridge 177. On FIG. 3e, such one-phase coils are exemplarily indicated by special numerals (130A) and (130B).

The frequency of flux reciprocating in the armature cores (and therefore the EMF frequency in the coils) in the example will be five times higher than the frequency of the outer intermittent force (of the wave) moving the inductor, since there are five magnets triggering the armature flux through each coil during one forward traveling of the inductor core, and the same five triggering the armature flux during the backward traveling. In this embodiment the number of magnets generally determines the multiple of increasing the reciprocating frequency of the EMF in comparison with the waves' frequency.

A Vertical Near-Shore Inventive Wave Energy Converter (IWEC).

Figure 4:
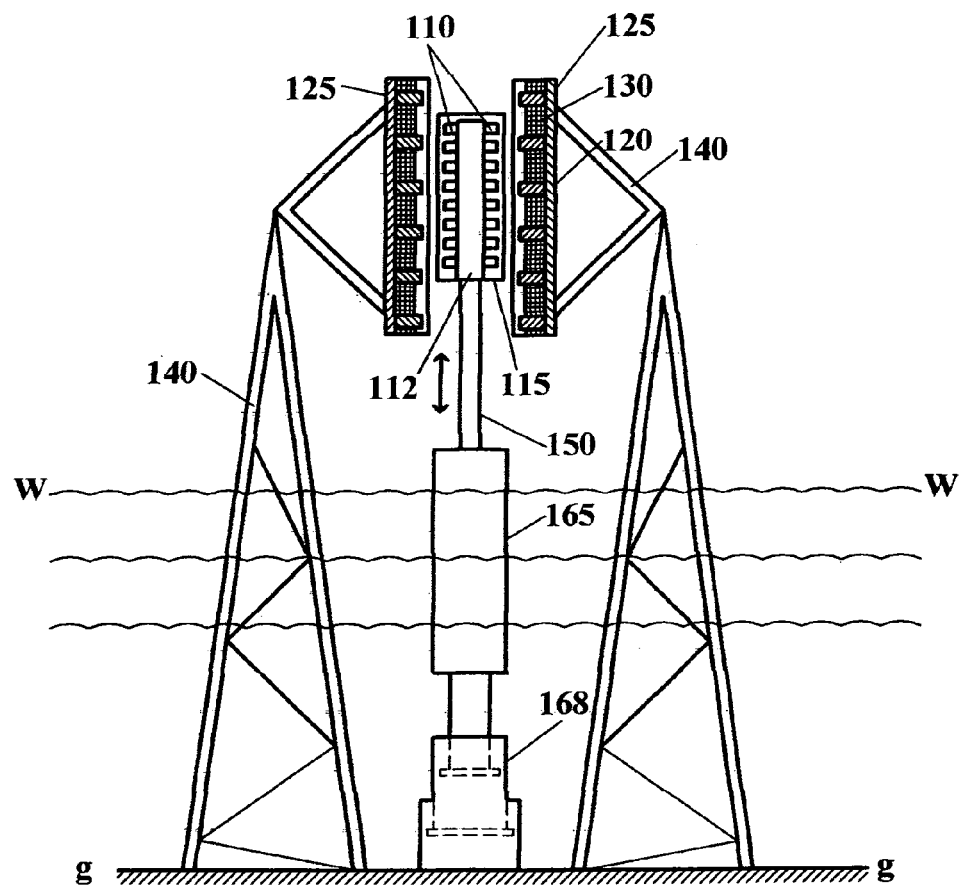
FIG. 4 is a view of a linear near-shore inventive wave energy converter (IWEC) employing said linear IWET, according to an embodiment of the present invention.

An embodiment of a near-shore (or on-shore) IWEC is illustrated on FIG. 4. The device essentially employs an embodiment of the above-described IWET, and comprises at least two holders (140) each supporting a casing (125). Each casing 125 encloses an armature core (120) with teeth (120T), and with coils (130) wound on core 120.

A telescopic leg (168) is mounted on the ground level of sea bottom (g-g) by its lower part, and its upper part flexibly supports an impelling means in the form of a float (165) vertically freely suspended in seawater reservoir (or in a lake or river mouth with a substantial wave movement) with a water level (w-w), shown on FIG. 4. Telescopic leg 168 may also adapt the buoyancy level of float 165 during periodic tidal level changes for a seawater reservoir.

A pushing elongated rod (150) connects the top of float 165 with an inductor core (112), having two rows of permanent magnets (110) linearly and fixedly disposed thereon. The sea surface waves push float 165 up and down, and cause the inductor to vertically reciprocate relative to the armature thereby inducing an EMF in coils 130 of the armature.

A Vertically Reciprocating IWEC with Rotational IWETs and Rack Gear.

Figure 7A:
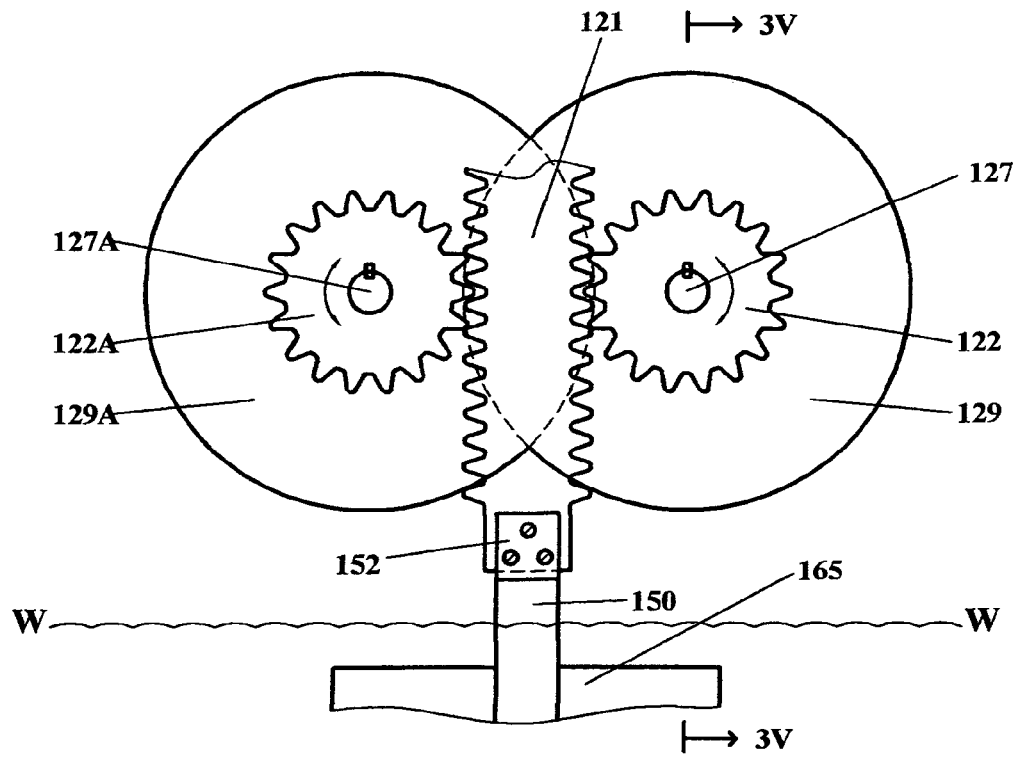
FIG. 7a is a frontal view of a rack gear mechanism, employed by a vertically reciprocating IWEC with rotational IWETs, according to an embodiment of the present invention.
Figure 7B:
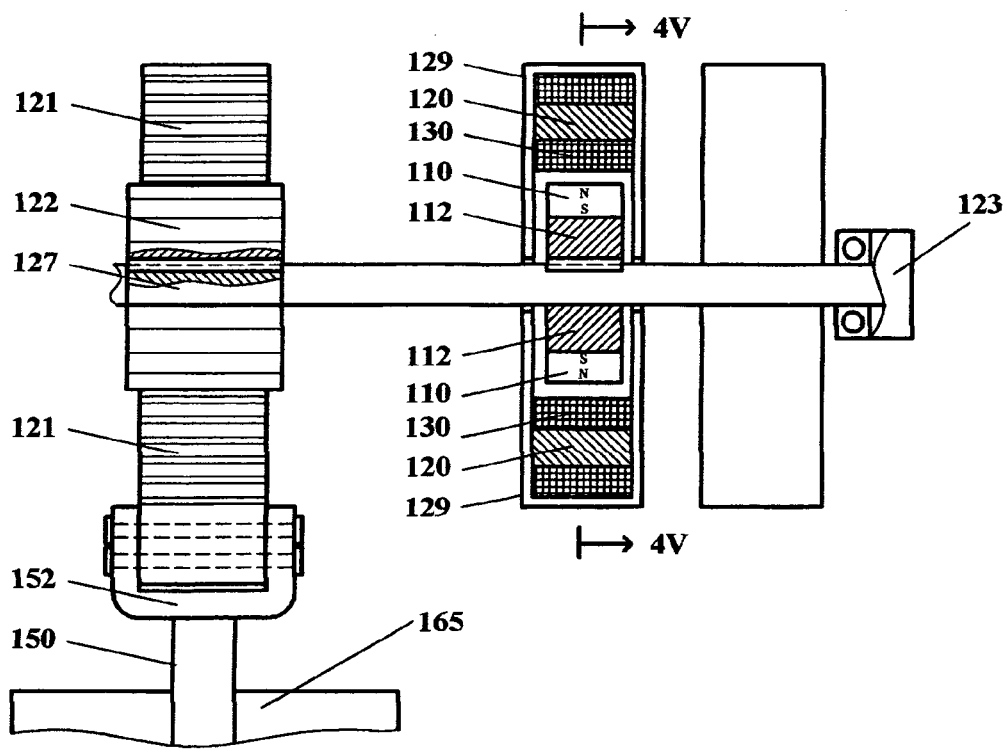
Figure 7C:
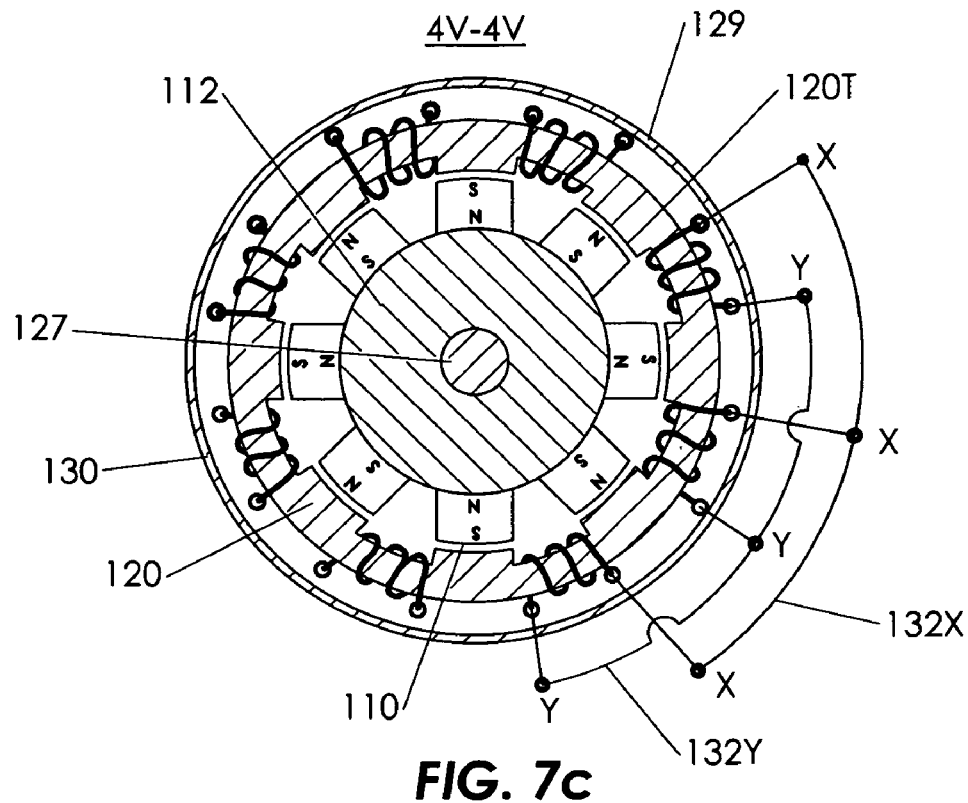
FIG. 7c is a frontal sectional view of a rotational IWET, employed by the vertically reciprocating IWEC, according to the embodiment of the present invention shown on FIG. 7a and FIG. 7b.

This IWEC employs a rotational embodiment of the IWET illustrated on FIGS. 7c and 7b. The IWET rotatable embodiment comprises a generally immovable cylindrical casing (129) enclosing and supporting an annular armature core (120) having teeth (120T) and coils (130) wound around core 120.

The embodiment comprises an elongated cylindrical rotatable shaft (127) substantially horizontally disposed and supported by at least a pair of step-bearings (123) (only one step-bearing 123 is illustrated on FIG. 7b), being capable to revolve about its longitudinal axe within a predetermined angle. An annular inductor core (112) is positioned on shaft 127 attached thereto, for example, by a dowel.

FIG. 7c reflects a plurality of magnets (110) peripherally mounted on core 112 with an equal interval between each neighboring pair of magnets 110. Shaft 127, core 112, and magnets 110 are enclosed within core 120, so that there is a substantially equal air gap (g1) between the outermost surfaces of teeth 120T and corresponding magnets 110. In this embodiment the number of teeth 120T is equal to the number of magnets 110, though the other types of IWET disclosed above may be used as well.

Terminals (X) and (Y) of every coil 150 are connected in parallel, respectively by a bus (132X) and a bus (132Y) as depicted on FIG. 7c (only three coils 130 are exemplarily shown to be connected to the buses). Buses 132X and 132Y may be connected to a rectifier (not shown in the drawings for this embodiment) outputting a direct electrical current into an external load circuit.

A vertically reciprocating float (165) (only a top fraction of the float is illustrated on FIG. 7a) is fixed to a rod (150) pushing a frame (152) attached to the upper end of rod 150. FIGS. 7a and 7b illustrate a rack gear comprising a rack (121), fixed by its lower end in frame 152, and being in proper contact with at least two pinions (122) and (122A). Pinions 122 and 122A further transform the linearly reciprocating vertical movement of rack 121 into a rotational motion of the above-described shaft 127 and correspondingly of another substantially identical shaft (127A) positioned in parallel to each other.

As mentioned above, shafts 127 (and 127A) is supported by at least two step-bearings 123 (though only one of them is shown on FIG. 7b). Preferably two IWETs enclosed into casings 129 (and 129A) should be symmetrically installed on each shaft 127 and 127A respectively, though only one right casing 129 and one right casing 129A are illustrated on FIG. 7b, and they are also seen on FIG. 7a. In the other words, four rotatable IWETs should preferably be connected to the rack gear described above to substantially equally distribute the mechanical load on the shafts. The rack gear is normally covered by its own casing that is not shown herein.

Casings 129 and 129A with IWETs may be installed on a platform (not shown for this embodiment) above the water level (w-w), while float 165 is vertically freely reciprocating similar to the one described in the previous embodiment.

During operation of the IWEC, the vertical reciprocating of float 165, rod 150, frame 152, and rack 121 is translated into the revolving of four inductor cores 112 with magnets 110, within a predetermined angle relatively to the four armature cores 120 with coils 130, thereby inducing intermittent EMFs in coils 130 connected to a rectifier that outputs electric power into an electrical load.

Alternatively, the linear reciprocating motion of the float may be translated into a rotation of an IWET's inductor using a worm gear, or another translating means that does not depart such a converter form the principles of the present invention.

A Modified Asymmetric Rotational IWET with Variable Gap.

The rotational IWET can be modified to damp excessively powerful sea waves arising during very strong storms. This damping will protect the WEC and, on the other hand, will generate more electric power during the storm.

For example, the rack gear may be so arranged that, during an excessively strong storm, it provides a maximum 180.degree turn of the pinion and the revolving inductor for the fill linear traveling of the float and rack (shown on FIG. 7a, 7b) upward, and then may turn 180.degree backward. Therefore, the inductor rotates from its initial 0.degree position corresponding the lowest possible position of the rack to the 180.degree position.

Figure 7D:
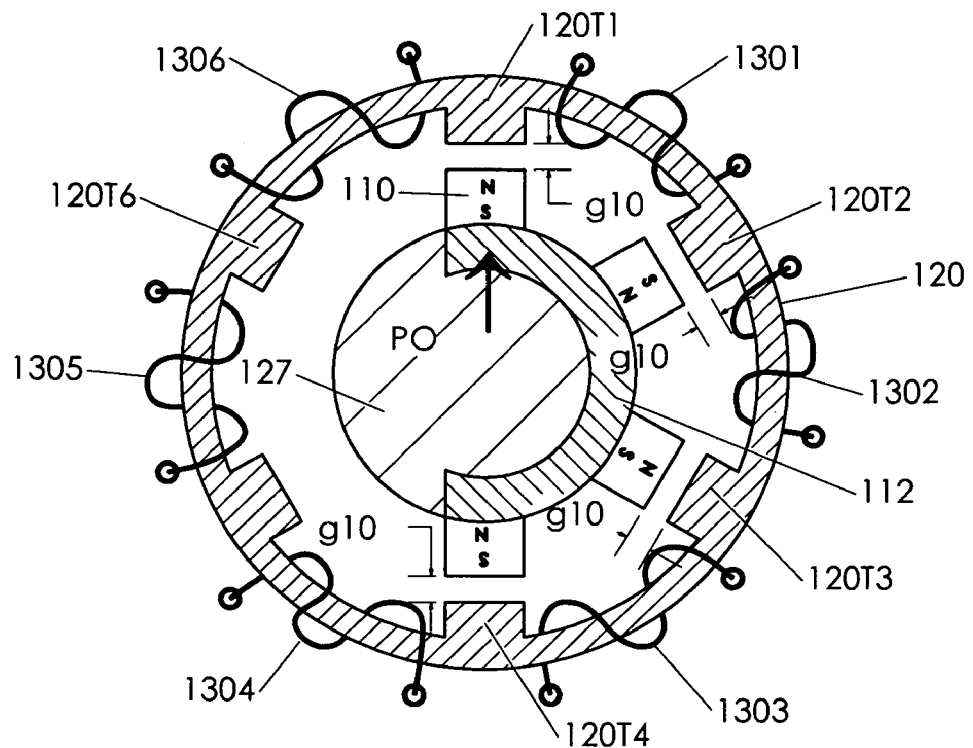
FIG. 7d is a sectional schematic view of a modified asymmetric rotational IWET with a variable gap, positioned at an initial 0.degree angle, employed by the vertically reciprocating IWEC, according to an embodiment of the present invention.
Figure 7E:
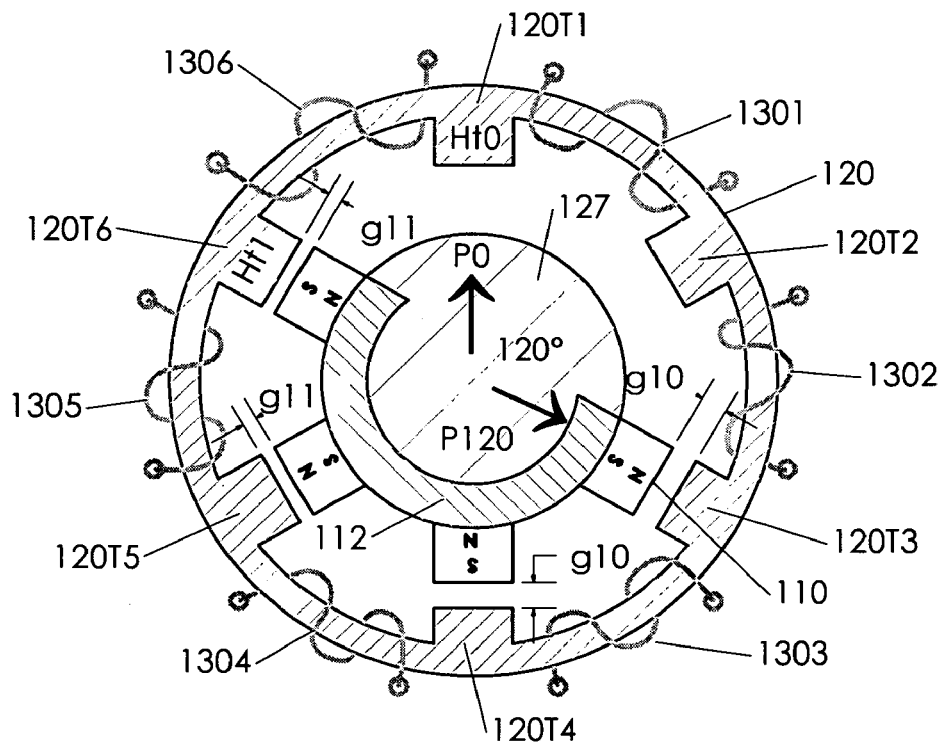
FIG. 7e is a sectional schematic view of a modified asymmetric rotational IWET, positioned at a 120.degree angle, employed by the vertically reciprocating IWEC, according to an embodiment of the present invention.

Referring to FIGS. 7d and 7e, there is illustrated an embodiment of a modified asymmetric rotational IWET, comprising an annular armature core (120), having a plurality of teeth (six teeth are shown herein) indicated as (120T1), (120T2), (120T3), (120T4), (120T5), and (120T6). In this example, four of the six teeth: 120T1, 120T2, 120T3, and 120T4 have a height (Ht0), and the remaining two 120T5 and 120T6 have a height (Ht1), wherein Ht1>Ht0.

The modified asymmetric rotational IWET comprises a plurality of coils 130 wound on core 120. Six such coils 130 are shown on FIG. 7d, 7e: (1301), (1302), (1303), (1304), (1305), and (1306).

The IWET comprises a cylindrical revolving shaft (127), for example, connected to and rotated by the pinions of the rack gear described in the foregoing rotational embodiment of IWET. The cross-section of shaft 127 is shaped as a circle with a cut-off segment as shown on FIG. 7e, 7d. Shaft 127 is made in a proper size and of proper material to withstand high distortion loads that may be caused by the excessively large waves.

The IWET comprises an inductor including an inductor core (112) of a segmental annular shape, rigidly and continuously coupled to shaft 127, so that the cross-section of the joined body of shaft 127 and core 112 has a round shape. Shaft 127 with core 112 should be properly balanced.

A plurality of magnets (110) is mounted on the outward surface of core 112, wherein each two neighboring magnets 110 are oriented in the opposite polarity (directed to and from shaft 127). In this embodiment, four magnets 110 are shown on FIG. 7d, 7e, which are made substantially identical, preferably of a rare earth magnetic material.

FIG. 7d reflects an operative position (P0) of the inductor wherein the driving float and the rack are being in their lowest position. It can be seen that all the four air gaps between the teeth and magnets are equal to (g10).

When a sea wave pushes the float (indicated as 165 on FIG. 7a, 7b) up, the pushing rod (150 on FIG. 7a, 7b) lifts the rack (121 on FIG. 7a, 7b), which turns the pinions (122 on FIG. 7a, 7b) revolving shaft 127 with the inductor, for example, at an angle of 120.degree into an operative position (P120), as shown on FIG. 7e.

The position P120, reflected on FIG. 7e, shows that the air gaps between tooth 120T3 and the corresponding magnet 110, and respectively between tooth 120T4 and the corresponding magnet 110 are (g10), whereas the air gaps between tooth 120T5 and the corresponding magnet 110, and respectively between tooth 120T6 and the corresponding magnet 110 are (g11) that is much narrower due to the greater height (Ht1) of teeth 120T5 and 120T6 than the height (Ht0) of teeth 120T3 and 120T4.

This causes a greater EMF in coil 1304 and much greater in coil 1305 than in coil 1303 during the rotation. If the coils are connected through a rectifier to a load circuit, the induced current creates a magnetic field in the coils, which produces a reaction force of the armature, tending to decelerate the inductor's rotation. The lesser the air gap between the magnets and teeth is, the more the reaction force is produced that absorbs the energy of the wave. On the other hand, the excessive absorbed energy is converted into additional electric power in the electrical load circuit. This IWET should generally be designed so that it would absorb maximum energy when revolved at an 180.degree angle.

An additional measure may be provided to absorb excessively powerful ocean waves impacts and generate more electric power from the excessive waves. The wiring of coils 1304, 1305, and 1306 may be chosen thicker (with a greater cross-section), to reduce the internal resistance of the coils and increase the induced current for the same load.

Alternatively, for some types of electrical loads tolerant to changing of voltage the number of wire turns in coils 1304, 1305, and 1306 may be increased. This will increase the EMF in these coils, the induced current, and respectively the magnitude of the armature reaction force decelerating the inductor. The EMF produced by coils with higher voltage (more wire turns) may also be used for a separate dedicated electric load, e.g. in magnetohydrodynamic units described in a further embodiment.

Providing Improved Shock Absorption by Combining Different IWETs.

The foregoing rotational IWET and modified asymmetric rotational IWET may be used in combination, wherein two (or more) such devices are mounted on one shaft 127 (not illustrated in the drawings). For some embodiments embracing such a combination, it is unnecessary to restrict the inductor of the modified asymmetric IWET by a limiting angle of 180.degree, since it may be switched on to decelerate the rotation of shaft 127 only during excessive waves, remaining off during the other time, wherein only the other (generally non-modified) IWET (or IWETs) would operate (that is its inductor means will rotate) alone.

Coils 1301, 1302, 1303, 1304, 1305, and 1306 of the modified asymmetric IWET, displayed on FIG. 7d, 7e, may be commutated by a control unit (not shown for this embodiment) capable of measuring parameters of sea waves (such as amplitude, phase, frequency), and in response to the measured parameters to connect (preferably in parallel) any desirable combination of the coils to a rectifier, and/or regulate the amount of induced electric current (e.g. by conventionally known semiconductor means) in any of or all the coils. Such control unit may also be configured to switch on additional electric load devices (e.g. electrolyzers, further shown for another embodiment of the invention) to utilize the additional electrical power converted from the energy of excessive waves.

Similarly, the rotational IWETs may be combined with non-rotational IWETs, described herein. Of course, suitable mechanisms may also be used in conjunction with the IWETs to absorb energy of extremely huge waves to protect the wave energy converter. Such mechanisms and other means are particularly described in some of the prior art documents aforementioned in the disclosure, and some of them are incorporated by reference herein. Another example of such a mechanism is a tidal adapter 155, shown on FIG. 9, discussed herein further.

An Underwater Pendulum IWEC.

Figure 5A:
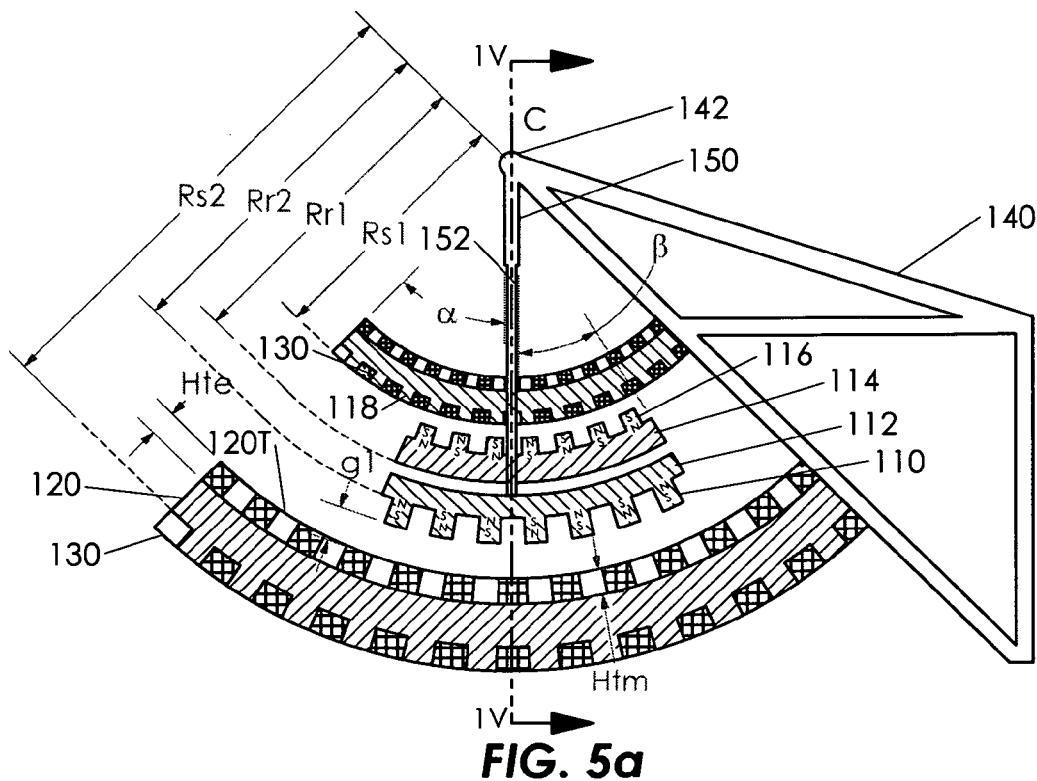
FIG. 5a is a schematic frontal sectional side view of an underwater pendulum IWEC, according to an embodiment of the present invention.
Figure 5B:
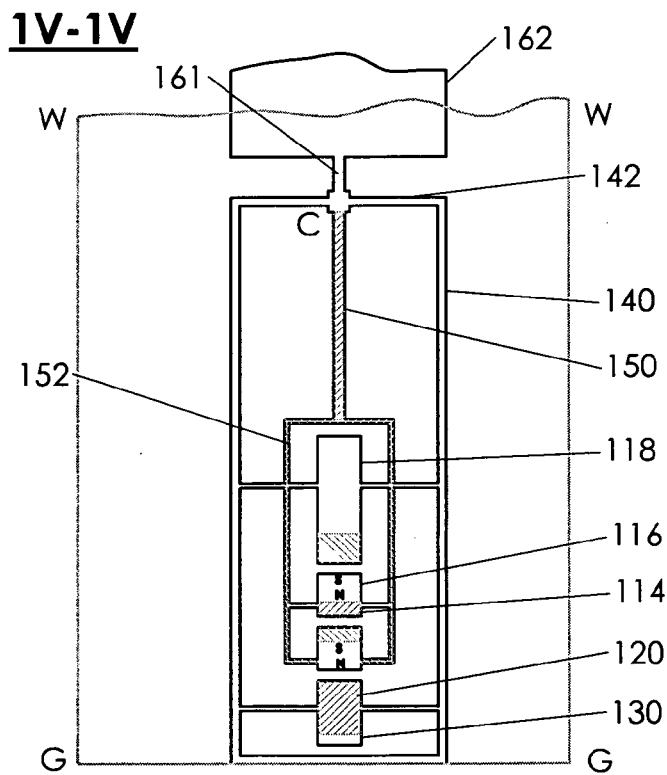

A pendulum IWET embodiment, primarily utilizing substantially horizontal impacts of sea waves running within a certain surface layer, is shown on FIGS. 5a and 5b. However, a similar pendulum embodiment may be adapted for using with vertically reciprocating floats as well. This embodiment can be used in underwater installations to power equipment, produce hydrogen from ocean water, etc. It may be conveniently hidden from storms, but still can use their powerful waves for electric power generation.

It comprises two arc segments of armature with an angular amount of two "alpha": an upper segment comprising an armature core 118 with coils 130 wound thereon; and a lower segment, comprising an armature core 118 with coils 130 wound thereon. Both the segments are supported by at least one holder 140. The lower core 120 has a radius (Rs2), and the upper core 118 has a radius (Rs1). The armature is preferably placed in a waterproof cover not shown in the drawings.

A pivot (142) is horizontally mounted along a line extending through the upper point C of holder 140. Pivot 142 supports a rod (150), which has a freedom to swing on pivot 142.

A frame (152) is fixed to the lower end of rod 150. Frame 152 supports an arc segment assembly with an angular amount of two "beta", including a lower inductor core (112) (the inductor should be placed in a water-proof cover not shown herein), having a radius (Rr1) with a plurality of magnets (110) downwardly mounted to core 112, and an upper inductor core (114) having a radius (Rr2) with a plurality of magnets (116) upwardly mounted to core 114. The difference between the "alpha" and "beta" angles determines the maximum arc of a one half-swinging of the inductor, which is provided by suitable stopper means (not shown herein).

Stronger surface waves may be damped and their high-energy potential additionally utilized in a way similar to the one disclosed for the rotational IWEC. As indicated on FIG. 5a, this may be done by making the height of tooth 120T situated substantially in the middle (Htm) greater than on the ends of core 120 (Hte), which makes the air gap (g1) variable. The variable air gap enables to achieve higher amplitudes of magnetic flux pulses in the ending coils 130 that will create a greater resistance to the pendulum swinging impelled by more powerful waves, and will increase the EMF in the ending coils 130 comparatively to the middle coils 130 that will convert more wave energy into useful electric power.

FIG. 5b illustrates a side sectional view 1V-1V indicated on FIG. 5a by arrows on the vertical axe. Additionally FIG. 5b shows a drive portion of an IWEC coupled to the IWET. The IWEC drive portion comprises a connecting lever (161) downwardly rigidly fixed to rod 150, and upwardly rigidly fixed to an impeller (162) disposed in the region of the water surface (w-w).

Thusly, the assembly, comprising cores 114 and 112 and magnets 110 and 116, may reciprocally swing, driven by impeller 162, being pushed by sea waves. Therefore, the main part of construction is disposed under the water level and the IWEC utilizes the energy of waves running on the water surface. The inductor and armature assemblies in this and other similar embodiments should be coated or otherwise protected from the seawater by means conventionally known to a person skilled in the art.

A Floating Platform-Based Pendulum IWEC.

Figure 6A:
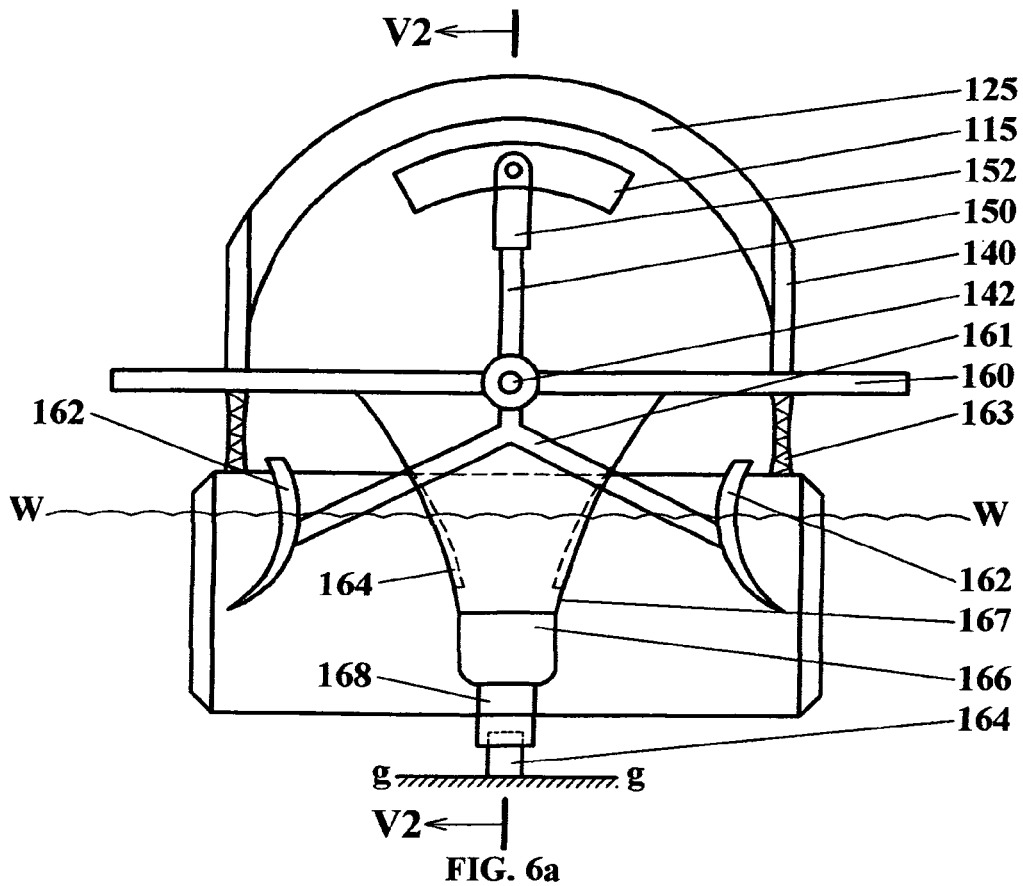
FIG. 6a is a frontal view of a floating platform-based pendulum IWEC, employing a pendulum IWET, according an embodiment of the present invention.
Figure 6B:
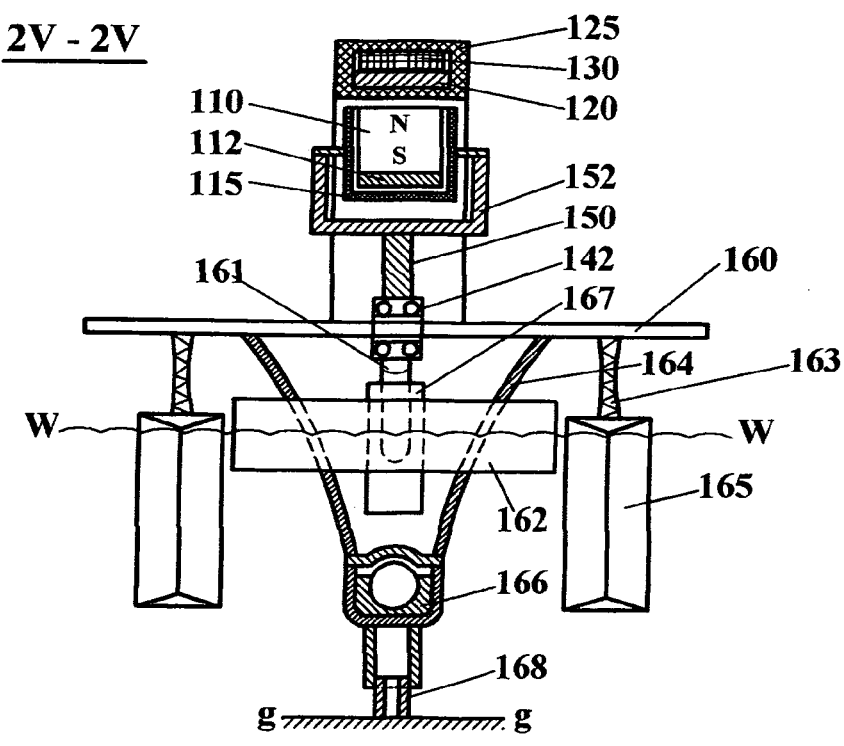

Another modified pendulum IWEC embodiment is illustrated on FIGS. 6a and 6b. A first difference from the previous pendulum embodiment is that a substantial part of this construction is disposed on a platform above the water level, which allows for essentially reducing the resistance to the swinging. A second difference is that it's driven by two impellers, which allows for more efficient utilizing the energy of both the forward and the backward sea waves (useful for on-shore or near-shore installations). A third difference is that this embodiment is capable to adapt its vertical position according to tidal water levels by using floats, a platform, and a telescopic leg. A fourth difference is that this construction is adaptable to alterations of the waves direction due to a special shape of the floats and an adjustable step-bearing, supporting a housing, both rotatable substantially in the horizontal plane.

It is believed that this IWET embodiment may be usable as a stand-alone construction for near-shore WEC installations, being combined with the above-disclosed vertical near-shore IWEC, as well as partially (without the housing bound to the ground) for off-shore installations, especially in combination with other platform-based embodiments utilizing vertical float reciprocation described herein below. Other embodiments (not shown) may comprise various devices, including gears, a ratchet wheel, etcetera, translating the energy of the substantially horizontal running waves impacts into linear, rotational, swinging or another type of movement to be used in conjunction with the IWETs of the present disclosure.

Referring to FIGS. 6a and 6b, this modified pendulum IWEC embodiment comprises a telescopic leg (168) by its lower end mounted on the ground level of sea bottom (g-g). A step-bearing (166) is mounted on the top of leg 168, which step-bearing 166 is made rotatable substantially in the horizontal plane, and also adjustable to allow for having a limited freedom of swinging deviations from the horizontal plane. The telescopic construction of leg 168 provides anchoring of the IWEC in the horizontal directions, and allows for the IWEC vertical adapting to changing tidal water levels.

A socket-shaped housing (164) is mounted on step-bearing 166 with its narrow lower base, and its wider upper base is coupled to a platform (160). Two oppositely disposed slots (167) are cut off in the walls of housing 164.

This IWEC embodiment comprises two floats (165), depicted on FIG. 6a, 6b, each substantially having a rectangular prismatic shape with two triangular prisms attached to its two narrower rectangular sidewalls. If necessary, the shape of floats 165 may be made different to allow for streamlining of upcoming sea waves to flow around the floats with minimum hydrodynamic resistance. At least two rigid supporting legs (163) are mounted on the upper surface of each float 165. The tops of supporting legs 163 are coupled to platform 160 providing its support while floats 165 are floating in seawater.

A pivot (142), shown on FIG. 6a, 6b, is mounted on platform 160 having its longitudinal axle extending substantially in a horizontal plane. A rigid lever (161) has a vertical arm and two inclined arms all jointed in the center of lever 161. Lever 161 is fixed to pivot 142, preferably in the lower region of the vertical arm, and capable to swing on the pivot axle. The inclined arms of lever 161 are inserted into slots 167 that is the swinging is restricted by the size of the slots. Lever 161 should be balance so that its vertical arm would be positioned substantially vertically absence sea waves.

FIG. 6a, 6b depict two impellers (162) that are mounted to the free ends of the two inclined arms of lever 161. Impellers 162 are preferably shaped as rectangular concave solid plates, or otherwise, to substantially enable collecting of maximum possible sea wave motion.

The IWEC embodiment substantially employing the above described annular segmental IWET (see FIG. 5a, 5b). The IWEC is illustrated on FIG. 6a, 6b, and comprises an elongated rod (150) fixed by its lower end to pivot 142. A frame (152) is fixedly coupled to rod 150. Frame 152 rigidly supports an inductor casing (115) of an arc-like shape, encapsulating an inductor core (112), having an arc segment shape, with magnets (110) mounted thereon.

FIG. 6a illustrates two holders (140) substantially vertically installed on platform 160. Holders 140 support an armature casing (125) enclosing an armature core (120) with coils (130) wound thereon. Core 120 is generally made similar to the previous embodiment, and may include teeth of different height for the reasons described above.

Optionally, the armature and inductor can be placed in a common protective casing (not shown), for example, having an underside slot to allow for rod 150 to swing thereby driving core 112.

A forward sea wave pushes one impeller 162 catching the wave with its concave surface. The mechanical force actuates a forward swing of lever 161, rod 150, frame 152, and inductor core 112 with magnets 110, which win move forward along armature core 120, and induce EMFs in coils 130. A backward sea wave will likewise create a backward move that will again cause an EMF inductive pulse in coils 130.

Floats 165, pushed by a forward sea wave, tend to revolve platform 160 substantially in the horizontal plane, so that one of the impellers 162 would face the forward sea wave and catch its motion energy. A corresponding backward wave would generally tend to revolve platform 160 so that the oppositely disposed impeller 162 would face the backward wave. Since the directions of the forward and backward waves are usually differ at 180.degree, the revolving of the platform should usually be small or unsubstantial. Step-bearing 166 should allow for absorbing lateral (usually insignificant) oscillations of floats 165 and platform 160.

A rectifier (not shown in the drawings for this embodiment) may be placed on platform 160 to rectify intermittent pulses of EMF in coils 130. The rectified current may feed an electrolyzer (not shown in the drawings for this embodiment), which can also be installed on platform 160. The electrolyzer would produce hydrogen gas from seawater, which hydrogen gas might be stored in the inner space of floats 165. When the hydrogen pressure inside floats 165 reaches a predetermined amount, a wireless device would transmit a series of signals to a coastal or a ship based dispatching station. Then the floats full with hydrogen would be exchanged for empty floats 165.

Adjustable Impellers for Running Surface Sea Waves.

IWEC impellers can be alternatively made as adjustable assemblies (not illustrated) of one or more elongated rigid blades, wherein each blade is capable to revolve around a suitable horizontally disposed elongated rod, and all the rods are fixed in parallel to substantially vertically disposed parallel ribs connected by a frame fixedly attached to the lower end of each of the inclined arms of lever 161.

This adjustable impeller version is not shown in the drawings attached hereto. Such a modified adjustable impeller normally has its blades being oriented so that they collectively form a concave-like shape, similar to the impellers 162 shown on FIG. 6a. This orientation is supported by a spring-loaded mechanism (not shown in the drawings) blocking the blades from revolving, which revolving may be caused by a releasing means (not shown).

When the inclined arm hits the upper end of slot 167 (which may happen during an extremely strong storm), the hit may be registered by a sensor or absorbed by a mechanical device (not shown), which will further send a signal (or convey its movement) to the releasing means allowing the blades to revolve (similarly to the well known window shading blinds), changing their orientation being compelled by the waves.

The releasing means may be performed, for instance, as a solenoid, and when electric current flows through its winding (initiated by said signal of the sensor), the blades, being pulled by the solenoid, are revolved to an opened position and stay in it for a predetermined time. Then the electric current is switched off; the solenoid returns to its initial position, and the blocking spring-loaded mechanism revolves the blades into their initial (closed) position. As a result, the impeller surface changes from a concave-like shape to a grating-like shape allowing the waves to flow through it, thereby protecting the device from the excessive large waves. The solenoid may also be actuated, for example, through a wireless command received from a dispatching station by a special transmitter-receiver installed on the platform.

A mechanical version of the releasing means (not illustrated) may be used, e.g. deploying two spring-loaded mechanisms mounted on a lever (similar to lever 161), receiving the impact (hitting a slot, similar to slot 167 on FIG. 6a, 6b), alternatively charging and discharging, being switched by a latch. The discharging mechanism rotates a pulley, conveying its movement via a wire hawser attached to a frame supporting the blades, held by the lever. The movement is further translated, pulling and turning the blades into the open position, which is kept during a predetermined time, and then the blades return to the closed position. The next hit will actuate the second spring-loaded mechanism to be discharged, and the first will be re-charged during that time, etc.

The angle of revolving the blades (or one blade, if a single-blade embodiment of the adjustable impeller is used) may also be arranged variable depending on the wave's strength by connecting the blades to a suitable regulating mechanism, for example of a spring-loaded type (not shown). Such regulating mechanisms and means are well known to a person skilled in the art, and may be chosen while applied to a particular construction of the IWEC. The aforesaid adjustable impeller construction may be utilized in wind-to-electric energy converters as well.

Other embodiments may comprise a vertically positioned impeller, or an impeller with a variable angle axle. Another possible option is to use one double-side impeller with two blades coupled to each other by their rear sides, and with the concave frontal sides facing outwardly, wherein each blade catches forward and backward waves respectively. Of course, the construction of the lever should be modified accordingly.

The above-mentioned wireless transmitter-receiver may also be used for other purposes, such as transmitting meteorological data, system parameters, waves and wind parameters, etc. For WECs producing hydrogen (discussed herein below), the hydrogen pressure, for example, may be measured and transmitted to the station.

A Controllable Multi-Sectional Linearly Reciprocating IWET (MSL-IWET).

Figure 8A:
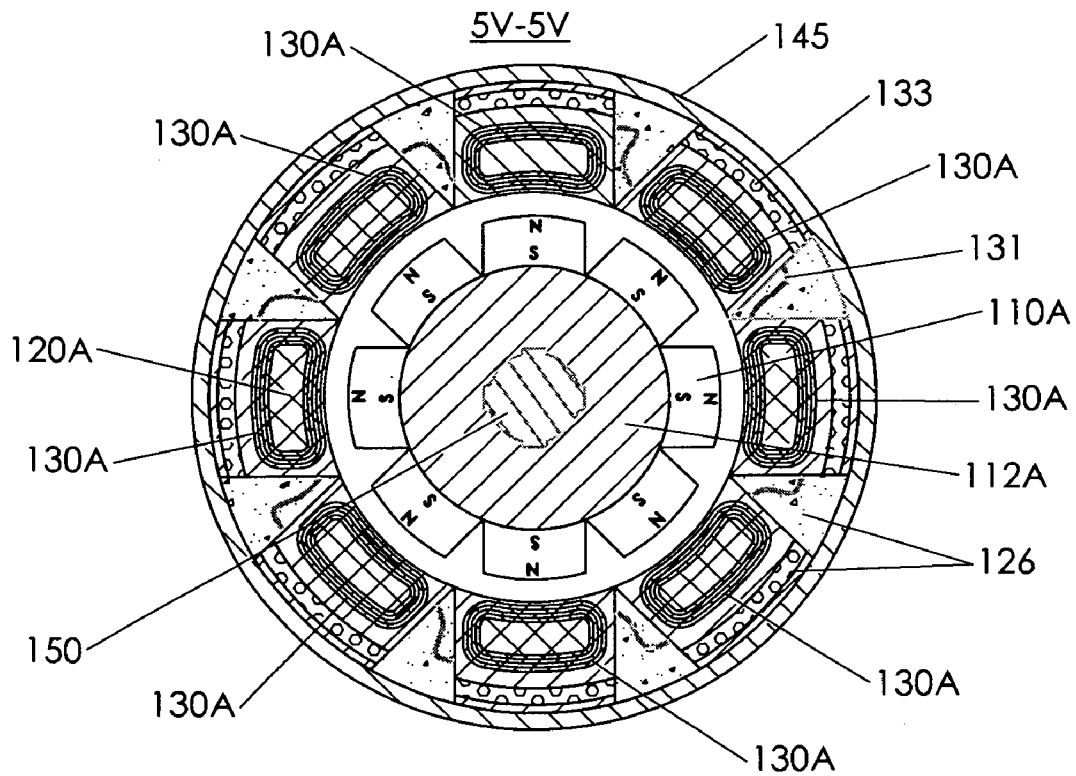
FIG. 8a is a radial cross-sectional view of a two-sectional vertical linear reciprocating MSL-IWET, according to an embodiment of the present invention.

FIG. 8a (a cross-sectional view 5V-5V) and 8b illustrate an embodiment of a multi-sectional linearly reciprocating IWET called MSL-IWET. For simplicity of discussion, this embodiment is demonstrated in a two-sectional variation, though other embodiments of MSL-IWET may comprise any necessary number of sections and may be appropriately combined with any IWET or IWEC embodiment disclosed herewithin. The MSL-IWET may be usable in off-shore platform-based installations, in near-shore installations with vertically reciprocating floats, and for horizontal or tilted installations to utilize the energy of surface sea waves, as well as for conversion of wind energy into usable electric power.

Figure 8B:
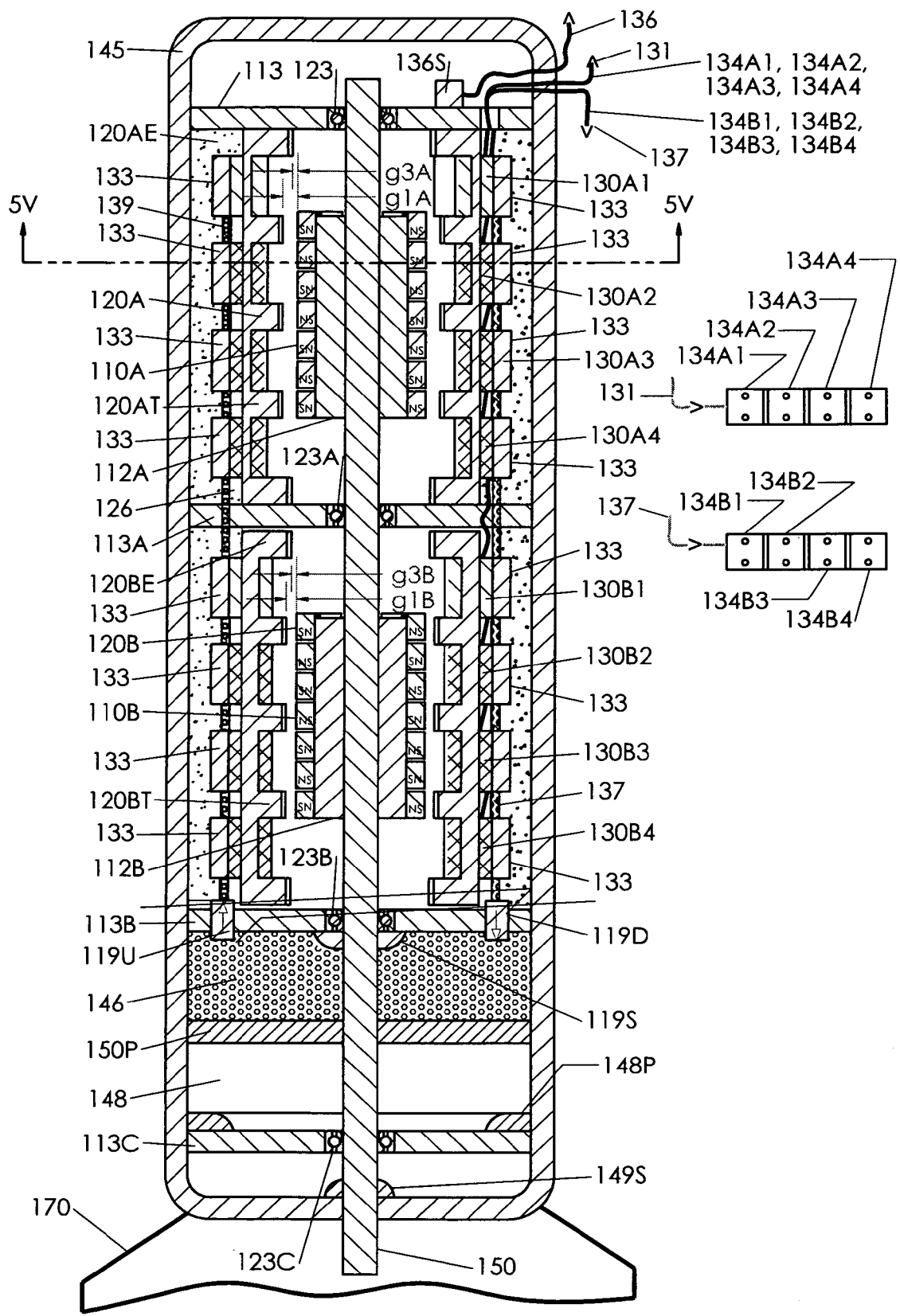

The embodiment comprises a casing (145) of a substantially hollow cylindrical shape mounted on a platform (170) partially shown on FIG. 8b. Casing 145 is divided into five compartments by four partition discs fixedly attached to casing 145: a top disc (113), an upper disc (113A), a lower disc (113B), and a bottom disc (113C), all displayed on FIG. 8b.

An elongated pushing rod (150), depicted on FIG. 8a, 8b, by its lower end fixed to a preferably floatable impelling means (not shown in the drawings of this embodiment) is slidely disposed within casing 145. Other embodiments may deploy non-floatable versions of the impelling means (for instance, for utilizing substantially horizontal impacts of running sea waves). Rod 150 is supported by sliding bearings (123), (123A), (123B), and (123C) installed accordingly in discs 113, 113A, 113B, and 113C. Rod 150 has preferably a cylindrical shape, except two its portions serving for a coupling with an inductor, described below, one of which portion is shown in its cross-section on FIG. 8a.

A sensor device (136S) for measuring motion parameters of rod 15 (e.g. the displacement, velocity, and acceleration of the reciprocating movements) is installed on disc 113, or may be mounted in another suitable place. Sensor 136S outputs the measured parameters in the form of electrical signals through wiring (136) for the further use in a control unit, as exemplified herein further.

This MSL-IWET comprises two IWET sections depicted on FIG. 8b (a combination of three sections will be discussed further in a modified embodiment). A top compartment is situated above disc 113; the first section (A) is placed in an upper compartment between discs 113 and 113A; the second section (B) is placed in a middle compartment between discs 113A and 113B. A lower compartment between discs 113B and 113C is used for a cooling liquid in this embodiment. A bottom compartment is situated below disc 113C.

The first section of the embodiment, as illustrated on FIG. 8b, 8a, comprises an armature including exemplary eight longitudinal armature cores (120A) axially and circumferentially disposed in casing 145, each core 120A having two types of teeth: middle teeth (120AT) with a predetermined height, and ending teeth (120AE) with another predetermined height greater than the height of teeth 120AT. Therefore, the first section comprises eight identical rows of teeth sequentially situated along the central longitudinal axis of the IWET.

Core 120A is fixed to casing 145 with fixing filling partitions (126). As in previous embodiments, core 120A may be assembled from thin flat isolated-laminated elements made of soft iron or a suitable type of electric transformer iron, bundled together.

As illustrated on FIG. 8a, the first section comprises, for example, eight substantially identical parallel rows of conductive coils (130A1), (130A2), (130A3), and (130A4). The coils are sequentially situated in each row, along the central longitudinal axis of the IWET, each coil having respectively two-strand wires ("plus-strand" and "minus-strand"): (134A1), (134A2), (134A3), and (134A4), wherein the ends of the wires are not connected in the IWET, as shown separately to the right on FIG. 8b. AU wires 134A1, 134A2, 134A3, and 134A4 are joined into a cable (131), which is displayed on FIGS. 8a and 8b.

The outermost surface of coils 130A1, 130A2, 130A3, and 130A4 is separated from the inward surface of filling 126 by a cooling pocket (133) as seen on FIG. 8a, 8b. Cooling pockets 133 of all the coils are sequentially communicated by through cooling channels (139).

The first section of the embodiment, as illustrated on FIG. 8b, 8a, comprises an inductor including a substantially cylindrical inductor core (112A) having a through inner central channel, which core 112A may be made of materials and by technology similar to core 120A. The inward surface of the inner channel of core 112A is continuously fixed to rod 150, as shown on FIG. 8a.

The inductor includes a plurality of permanent magnets (110A) mounted peripherally around and longitudinally along core 112A forming eight rows in this embodiment, as illustrated on FIG. 8a, 8b. Magnets 110A are performed similar to those described in the above embodiments. Other embodiments may use electromagnets.

Magnets 110A are positioned so that any two neighboring magnets in the peripheral direction have the same magnetic polarity, whereas any two neighboring magnets in the longitudinal direction have the opposite magnetic polarity, as illustrated on FIG. 8a, 8b. The preferable size relations between the magnets and air gaps are previously described.

The structure of the two-sectional MSL-IWET, illustrated on FIG. 8a, 8b, and its elements and relations therebetween are herein described for only one row of teeth, coils, or magnets, with the understanding that the description is equally applied to any other of the identical rows of corresponding teeth, coils, or magnets.

This embodiment uses the above-discussed schema of the "IWET Having More Magnets Than Teeth". An air gap (g1A) between magnets 110A and the middle teeth 120AT is made substantially greater than an air gap (g3A) between magnets 110A and the ending teeth 120AE due to their different heights, as indicated above.

The whole foregoing description of the first section (A) of the MSL-IWET is respectively applied to the second section (B) by substituting the reference numerals on FIG. 8b, as follows: (120A) for (120B), (120AT) for (120 BT), (120AE) for (120BE), (130A1) for (130B1), (130A2) for (130B2), (130A3) for (130B3), (130A4) for (130B4), (134A1) for (134B1), (134A2) for (134B2), (134A3) for (134B3), (134A4) for (134B4), (112A) for (112B), (110A) for (110B), (g1A) for (g1B), (g3A) for (g3B), (131) for (137).

However, in this embodiment there are sizing differences: the cross-section of the coils wiring for section A is significantly less than for section B, as well as the widths of the armature and inductor cores for section A is also less than for section B. As a result, the air gap (g1A) is greater than (g1B), and (g3A) is greater than (g3B).

The MSL-IWET comprises a piston (150P) fixed to rod 150 in its lower part, so that during reciprocation of rod 150, piston 150P is moved within the lower compartment of casing 145 that is between discs 113B and 113C. Piston 150P divides the lower compartment into two portions: an upward portion (146) and a downward portion (148).

The upward portion 146 is filled up by a suitable cooling liquid to cool up the coils. There is a sealing means (119S) mounted at the top region of the lower compartment to prevent leaking of the cooling liquid from this lower compartment into the middle compartment in the space between coils 130B4 and rod 150.

Suitable one-way valves are mounted into disc 113B: at least one upward valve (119U), and at least one downward valve (119D) preferably with predetermined levels of triggering pressure.

There is a padding ring (148P), made of proper resilient materials, peripherally attached to the upward surface of disc 113C for shock absorbing when piston 150P lowers to its lowest point tending to touch disc 113C. Optionally another pneumatic or hydraulic padding means, or a magnetic suspension means may be used for this purpose. There is another sealing means (149S) installed at the very bottom of casing 145 around the opening for rod 150, to prevent water from entering inside the casing.

Example of Operation of a Two-Sectional MSL-IWET.

An embodiment of the MSL-IWET, shown on FIG. 8b may be so configured that, during regular ocean waves reciprocating movements, the driving float (not shown on FIG. 8b) and pushing rod 150 substantially vertically displace inductor cores 120A and 120B upward and downward, inducing an EMF in coils of sections A and B.

During the normal operation mode (sea waves are of a small or medium size), the coils of section B are switched off, and there is no induced current in them. The neutral position of rod 150 is chosen so that the middle magnets 110 of cores 112A and 112B are respectively situated approximately opposite the middle teeth 120AT and 120BT of the corresponding cores 120A and 120B. The air gap between magnets 110A and teeth 120AT is equal to (g1A) as illustrated on FIG. 8b.

931 The coils of section A—130A1, 130A2, 130A3, and 130A4 are switched on, but pulses of alternative electric current are induced (as described above), but only in the middle coils 130A2 and 130A3. The ending coils 130A1 and 130A4 don't carry electric current, since the ending (uppermost and lowermost) magnets 110A don't reach the zones of ending (uppermost and lowermost) teeth 120AE.

The corresponding wiring pairs 134A1, 134A2, 134A3, and 134A4 are joined in one cable 131 generally connecting the wires with a rectifier (preferably in parallel), and further with an electrical load. Such a rectifier may be included into a commutator-rectifier (177), which is reflected on FIG. 11, and described further herein.

During the upward vertical displacement piston 150P compresses the cooling liquid in upper portion 146 of the lower compartment, and, at a predetermined pressure, opens valve 113B inletting the cooling liquid through channel 139 into cooling pockets 133 of all the coils of the transducer. In this example, it cools up coils 130A2 and 130A3, carrying electric current.

During the downward displacement of piston 150P, portion 146 is extended and the pressure therein decreases, which causes valve 119U to close and valve 119D to open. The cooling liquid returns to the lower compartment's portion 146; that is the liquid circulates through the contour of channels 139 and cooling pockets 133 during the reciprocating movements of rod 150.

The amplitude, frequency of vertical oscillations, displacement of rod 150, its velocity, and acceleration (motion parameters) are registered and measured by sensor device 136S (shown on FIG. 8b), and through signal wiring 136 are transmitted to a control unit (described further herein). In particular, the control unit, according to a program, may, for example, compute the number of coils to be connected to a rectifier based on the instant amount of amplitude of rod 150; that is some of the coils may be switched off or on.

During a storm, the amplitude of waves, and the displacement of rod 150 are increasing, and the ending magnets 110A enter the zones of magnetic interaction with ending (uppermost and lowermost) teeth 120AE (the air gap is equal to g3A), and, if coils 130A1 and 130A4 are switched on and connected to the rectifier, an electric current is induced therein, slowing the movement of rod 150, but producing more electric power at the same time.

During a strong storm, sensor device 136S registers high velocity and acceleration of rod 150, and the control unit may switch coils 130B2 and 130B3 (the g1B air gaps are involved) on, which will further decelerate the movement of rod 150, and simultaneously generate more electric power.

If the strong storm further increases, coils 130B1 and 130B2 will be switched on, decelerating the movement of rod 150, and limiting the amplitude to a predetermined maximum, and generating a predetermined maximum of electric power. Padding ring 148P restricts the downward movement of rod 150. An analogous padding ring (not shown) may be installed in the top compartment of casing 145, restricting the upward movement.

The predetermined maximum amplitude of the MSL-WET mostly depends on the capacity of magnets 110, coils 130, the inertial mass of the system, strength of materials used for building the WEC, and other parameters. For extra huge storms or hurricanes, it might be possible to switch the device off, and bind the armature and inductor together, and decouple rod 150 and the driving float by a suitable mechanism. Particularly the means described in U.S. Pat. No. 6,768,217 (motion translator, buffer system, etc.) and in the other mentioned above patents incorporated by reference, may be utilized in a combination with the MSL-IWET, if properly combined.

A Three-Sectional MSL-IWET Usable with WECs and Wind Converters.

Figure 8D:
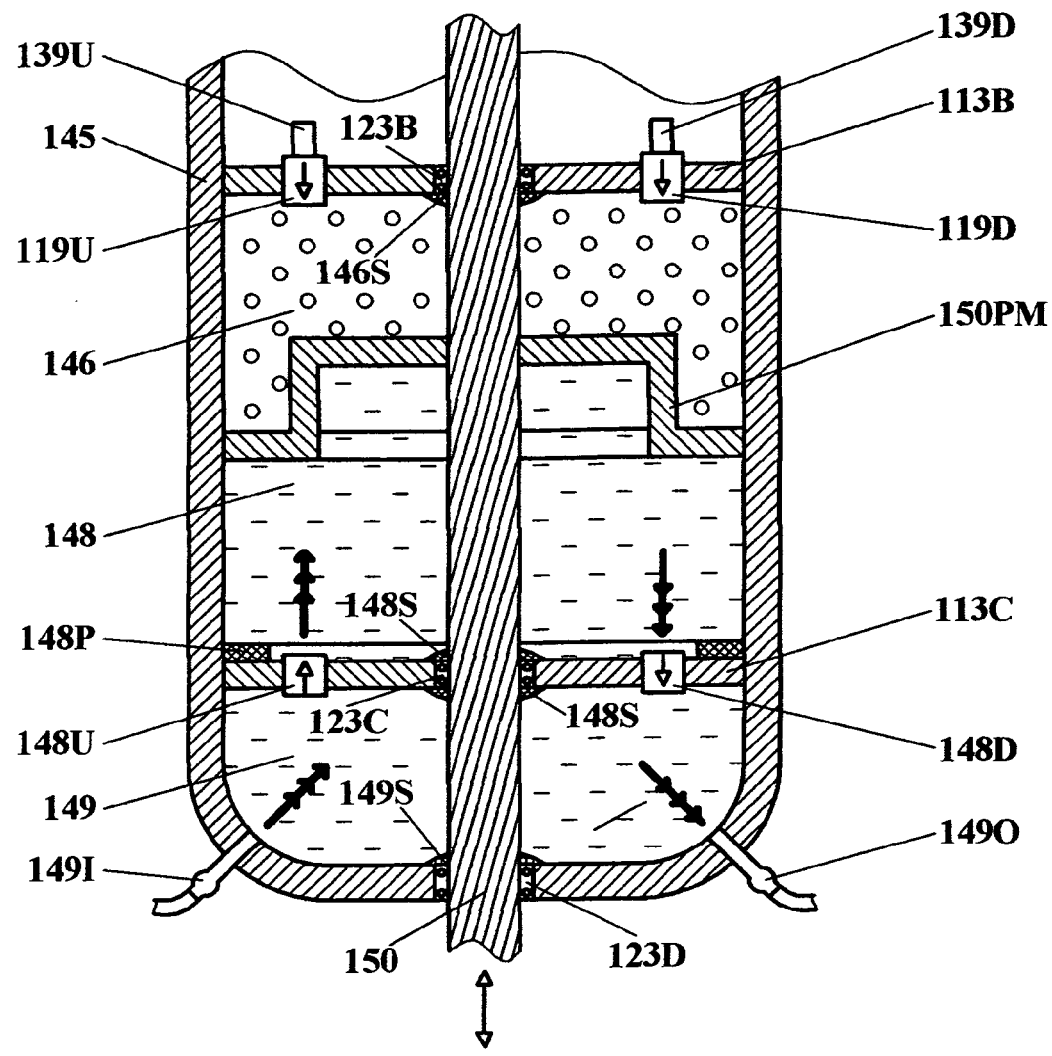
FIG. 8d is a schematic view of a disposition of armature and inductor elements for another modified embodiment of a three-sectional linear reciprocating MSL-IWET, according to an embodiment of the present invention.
Figure 8D:
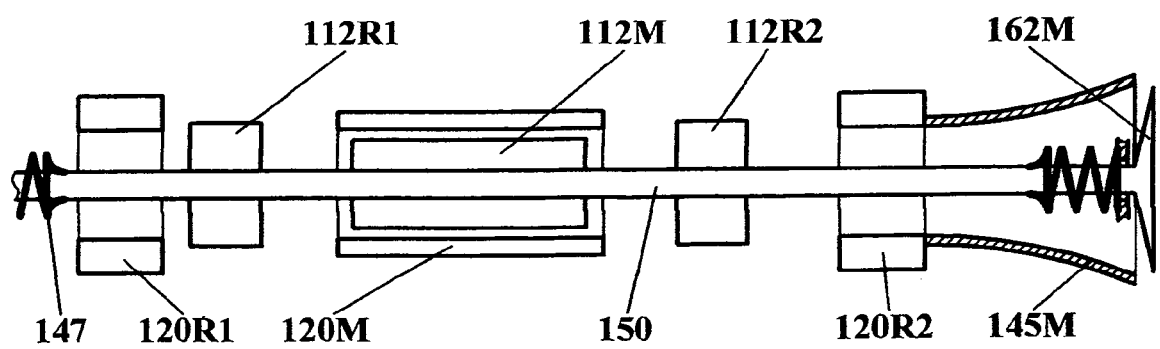

An embodiment of a three-sectional MSL-IWET is schematically illustrated on FIG. 8d. The device may be constructed in a horizontal installation version (utilizing the energy of running surface sea waves), shown on FIG. 8d, or in a vertical installation version (not shown, but substantially similar to the above-described two-sectional MSL-IWET). A middle section M (similar to the section A of the previous embodiment of two-sectional MSL-IWET) of the device includes an armature core (120M) and an inductor core (112M). For simplicity, the coils and other elements are not shown on the schema. The ending sections R1 and R2 (similar to the previous section B) are disposed to the left or the right of the middle section M (or respectively above and below the section M, if the vertical installation is chosen).

The ending sections R1 and R2 correspondingly comprise armature cores (120R1) and (120R2), and inductor cores (112R1) and (112R2), fixed on a rod (150) attached to an impelling means. All the armature cores 120R1, 120M, 120R2 are made immovable in a coordinate system. All the inductor cores 112R1, 112M, 112R2 are made movable relative to the armature.

Two springs (147) are mounted to the left (or above in the vertical installation) from core 120R1, and to the right (or under in the vertical installation) from core 120R2. Springs 147 are fixed with their inward edges to rod 150, and fixed preferably to casing's surfaces immovable relatively to the armature.

The three-sectional MSL-IWET operates similar to the foregoing two-sectional MSL-IWET, differing however in that, during regular operation, two short inductor sections 112R1 and 112R2 are preferably not positioned within, and not magnetically interacting with the corresponding armature sections 120R1 and 120R2, as depicted on FIG. 8d. Only extra-strong outer impacts cause the ending sections to be involved in operation intensively decelerating rod 150 with all inductor cores, at the same time producing more electric power. Meanwhile, springs 147 additionally limit the reciprocating movement for such extra-strong impacts (acting as stoppers when fully depressed), and, on the other hand, help returning the inductors to the neutral position during the regular operation. The springs may be substituted for another resilient means, or, e.g. for a pair of permanent magnets facing each other with the same polarity, a hydraulic or pneumatic shock absorbing means, etc.

This embodiment of MSL-IWET may also be driven by wind, where it's installed preferably horizontally, and encapsulated in a suitable casing, having, for example, two bell-shaped ending portions (145M), one of which is shown on FIG. 8d. For a wind-driven embodiment, a possible shape of an impeller (162M) is also depicted on FIG. 8d. The casing should preferably be furnished with proper means, well known to a skilled artisan, for aerodynamically orienting the MSL-IWET (which should be capable of spinning in the horizontal plane) to face the instant wind direction.

Of course, any desirable number of armature-inductor pairs, including coils, and any control hardware and software, necessary for optimization of the device's operation, can be used in designing of MSL-IWETs for sea wave and wind energy converters.

Modified Lower and Bottom Compartments with a Heat Exchanger.

During high-frequency, great velocity and acceleration movements, the armature coils may be subjected to intensive heating that generally negatively affects the device operation. The cooling sub-system shown on FIG. 8b may appear to be not sufficiently effective. A modified embodiment of the MSL-IWET might help to solve the problem.

Such embodiment, illustrated on FIG. 8d, comprises a substantially cylindrical casing (145) enclosing the MSL-IWET as indicated in the previous its embodiments; a rod (150) connected to a driving float (not shown in this embodiment). Rod 150 is substantially vertically slideable, particularly along a bearing (123B) mounted in a disc (113B), a bearing (123C) mounted in a disc (113C), and a bearing (123D) mounted in a disc (113D). All the discs are immovably fixed in casing 145, and furnished with sealing means 146S, 148S, and 149S correspondingly.

A padding ring (148P), mounted on the upper surface of disc 113C, absorbs impacts of the rod's downward movements. A similar ring (not shown herein) may be installed on the underside of disc 113B. The device comprises modified lower and bottom compartments.

The lower compartment, limited on its top by disc 113B and on its bottom by disc 113C, includes two portions: an upward portion (146) and a downward portion (148). These portions are formed by dividing the lower compartment by a modified piston (150PM) of a "sombrero-like" shape with cylindrical sidewalls so positioned that the opening is facing downward, and the edge of the opening is continuously coupled with an inner edge of a flat (washer-like) ring. The top flat rounded part of piston 150PM has a central hole with the edge fixedly attached to rod 150. An outer edge of the flat ring is snug-fitting within the cylindrical body of casing 145. Piston 150PM should be made of materials with a predeterminedly high heat conductivity.

Therefore, the volumes of the two portions 146 and 148 inversely change during the vertical reciprocating movements of rod 150. The lower compartment is filled up with a suitable primary cooling liquid (a means of inletting and outletting the liquid are not shown herein) used for cooling up the armature coils as mentioned above.

An upward inletting valve (119U), connected to a cooling channel (139U), and a downward insetting valve (119D), connected to a cooling channel (139D) are mounted in disc 113B. An upward inletting valve (148U), and a downward inletting valve (148D) are mounted in disc 113C.

The bottom compartment of the MSL-IWET, limited on its top by disc 113C and on its bottom by the bottom of casing 145, is furnished by a water inlet (1491) and a water outlet (1490) (both may be furnished with one-way valves of the corresponding directions and additional pumps, if necessary), and mounted in the bottom region of the bottom compartment, as reflected on FIG. 8c.

A means for de-aeration (not shown) of portion 148 should preferably be arranged. The bottom compartment and portion 148 are filled up by a secondary cooling liquid, for example, by seawater. Other embodiments may use secondary cooling liquids other than water, if necessary.

During operation, piston 150PM pumps the primary cooling liquid from upward portion 146 of the lower compartment through valve 119U into the cooling pockets 133 (shown on FIG. 8a, 8b) of the device, and back to portion 146 through valve 119D in a manner similar to the one described for the two-sectional MSL-IWET. The output primary cooling liquid has a substantially higher temperature than the input primary cooling liquid, thus the average primary liquid temperature in portion 146 tends to increase.

At any upward traveling of rod 150 with piston 150PM, the volume of downward portion 148 is extending upwardly (that reduces the pressure of water in portion 148), causing valve 148U to open, and to inlet additional seawater into portion 148, which tends to reduce the average primary liquid temperature in portion 146, thereby cooling up the primary cooling liquid. At a downward traveling of piston 150PM, the volume of portion 148 is contracting, thereby forcing the water body therein to exit through valve 148D to the bottom compartment and further out from the bottom compartment through outlet 1490.

The next upward traveling causes valve 148U to open, and a fraction of the water body inside bottom compartment 149 flows into portion 148, reducing the pressure in the bottom compartment, and causes inlet 1491 to open and additional seawater enters into compartment 149. Thusly, each reciprocating cycle of the device at least partially replenishes seawater in compartment 149 and portion 148, thereby cooling up the water body therein, and consequently cooling up the primary cooling liquid in portion 146, and therefore in the cooling subsystem of the MSL-IWET. In the other words, the whole unit, comprising piston 150PM, lower compartment portion 148, valves 148U and 148D, bottom compartment 149, inlet 1491 and outlet 1490, operates as a heat exchanger.

Meanwhile, the seawater flowing out of compartment 149 through outlet 1490 has a higher temperature than the seawater (preferably the surrounding seawater may be used) flowing into through inlet 1491. This warmed up seawater may be utilized for electrolysis to more efficiently produce hydrogen, since the higher the temperature of a water body in an electrolyzer is, the less electrical energy is required to dissociate the water body into hydrogen and oxygen.

In other embodiments, the above described heat exchanger subsystem may be arranged upside-down, so that the heat flow from the coils would be increased as a result of a natural convection, which would provide improved cooling. On the other hand, it might somehow complicate the design, since would require arranging the inlet and outlet devices and the seawater hoses in the upper part of the MSL-IWET.

A Platform-Based IWEC System (IWECS) with Freely Buoying Floats.

As it is well known, sea waves are propagated in a comparatively narrow upper layer of seas or oceans, and the dipper layers remain generally unaffected by the waves. Thus, many known WEC constructions deploy a vertically reciprocating float moved by the surface waves relatively to a substantially immovable housing rigidly anchored to the sea bottom ground level (the housing is often placed underwater, for instance, as taught in the above mentioned U.S. Pat. No. 6,833,631) or to a construction fixed to the ground, e.g. as described in the "Vertical Near-Shore Inventive Wave Energy Converter" herein above. The armature and inductor structures are usually fixedly attached to the float and the housing respectively or vice-versa In case of a flexible anchoring for both the structures, different amplitudes, frequencies, or phases of the armature and inductor movements should be arranged to provide conditions for electric current induction.

For an effective energy conversion, the dimensions of the float should generally commensurate with the wavelength that often is substantially greater than the float's dimensions. A platform with larger dimensions might perform the role of the float, then the housing would logically be somehow linked to the ground either rigidly, or with an arrangement for difference of amplitudes and/or frequencies and/or phases (oscillation parameters) of said armature and inductor movements. The rigid variation would require additional expenses for making and fixing additional elements to the sea bottom, which expenses can be very significant for off-shore installations, because of the great depth. The arrangement of different oscillation parameters would often involve a complicated design and tuning of such a system.

The present invention particularly provides another approach to the arrangement of different oscillation parameters for the armature and inductor. According to an embodiment of a platform-based inventive wave energy conversion system (IWECS), the platform is flexibly tied to an underwater anchoring subsystem providing for limited substantially vertical reciprocation of the platform, whereas a plurality of floatable impelling means are substantially freely and vertically buoying within "virtual vessels", at least partially performed in the form of substantially vertical through holes in the body of the platform, wherein the bottom openings of the virtual vessels are positioned at a predetermined depth level, substantially unaffected by surface sea waves. This results in: firstly providing an inertial water mass that is limitly sensitive to the surface waves and thus creating a condition for different oscillation parameters of the platform and the floats; and secondly providing a substantial horizontal stabilization of the platform during strong storms.

The platform and the floats are respectively coupled with armatures and inductors of IWETs disclosed herein, or may optionally be coupled with other similar types of transducers or with other devices transforming the waves motion energy into electric power.

Figure 9:
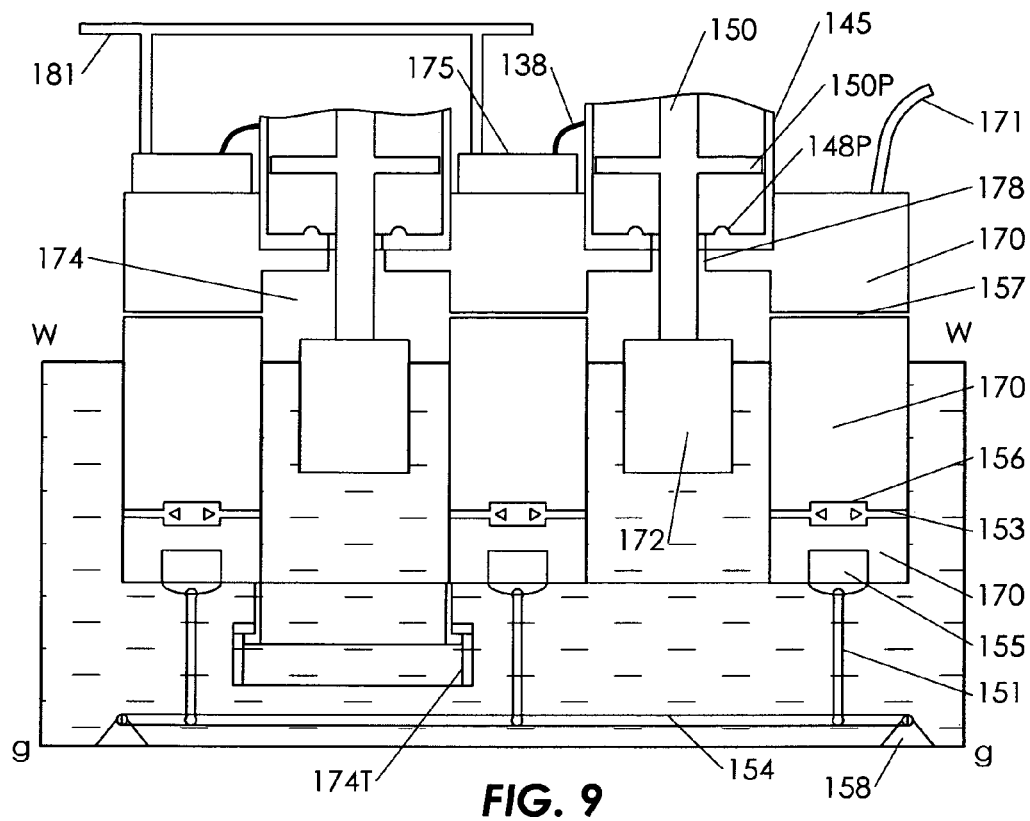
FIG. 9 is a partial frontal sectional view of a platform-based IWEC system (IWECS) with freely buoying floats for hydrogen production, according to an embodiment of the present invention.

An embodiment of the IWECS is illustrated on FIG. 9. The IWECS comprises at least one platform (170), made of suitable materials to provide a predetermined buoyancy of the platform, and preferably made with basic dimensions to commensurate with an average (and most frequent) wavelength in given sea or ocean location.

Platform 170 includes a plurality of substantially vertical and preferably identical cylindrical holes (174) provided in the body of platform 170, wherein the lower opening of each hole 174 is situated on the underside surface of the platform body, and the top of each hole 174 is positioned in a substantially horizontal plane situated predeterminedly lower the upper surface of the platform body. Preferably, holes 174 each communicates with its neighboring holes 174 and with the atmosphere by means of horizontal (or other) air channels (157) generally positioned predeterminedly higher the water level (w-w) shown on FIG. 9, when platform 170 is fully loaded.

Platform 170 comprises a plurality of substantially vertical cylindrical through channels herein called necks (178), made so that the top opening of each neck 178 is situated on the upper surface of platform 170, and the bottom opening of the neck is situated in the aforesaid substantially horizontal plane with the top of hole 174. The diameter of neck 178 is less than the diameter of hole 174. The central vertical axis of hole 174 and the central vertical axis of neck 178 substantially coincide. Thus, in this embodiment, each pair of hole 174 and neck 178 forms a resulting through hole having two cylindrical portions with different diameters (smaller 178 and greater 174) along its longitudinal vertical axis. Other embodiments may use non-cylindrical or otherwise shaped holes and necks, if necessary.

The IWECS embodiment comprises a plurality of anchors (158) fixedly attached to the sea bottom ground (g-g) shown on FIG. 9. Anchors 158 may for instance have a plate-like shape upwardly concaved (not shown in the drawings) to use an "added" inertial water mass for anchoring. A rigid or flexible frame (154) fixed to anchors 158. If the flexible version of frame is used, frame 154 includes cables or wire hawsers stretched between anchors 158. The IWECS comprises a plurality of tie-down cables (151) attached by their lower ends to frame 154 with a predetermined slack.

The IWECS comprises a plurality of tidal adapters (155) shown on FIG. 9, mounted to the underside of platform 170, and attached to the upper ends of cables 151. Adapter 155 is a means for changing the length of cable 151 between platform 170 and frame 154 following the periodic tidal alterations of the water level (w-w). Constructively, adapter 155 may be made spring-loaded (details are not shown herein), and allowing cable 151 to extend, depending on the changing of an average tension measured within a sufficiently lasting predetermined time interval, while blocking, if necessary, cable extensions for regular reciprocating movements of platform 170 caused by sea waves with significantly higher frequencies than the tidal level alterations. Other embodiments do not use a frame, but rather have dedicated attachments of tie-down cables 151 to individual tidal adapters 155.

In other embodiments, adapters 155 may optionally be programmatically controlled by a control unit (not shown for this embodiment), and provide expansions and contractions of cables 151 based on a time schedule reflecting daily tidal alterations. The control unit might also be programmed to operate adapter 155 so that it would change the amount of slack of cable 151 depending, for example, on the amplitude of waves during a strong storm. The control unit may be wirelessly controlled from a dispatching station.

Some embodiments may comprise platform 170 with substantially horizontal water channels (153) between of each two neighboring holes 172 and for communication with the outside water body surrounding platform 170, as depicted on FIG. 9. A controllable two-way valve (156) may be disposed within channel 153, or incorporated therein.

Channels 153 with valves 156 may be used for changing of the natural frequency of platform 170 with the anchoring subsystem (usually including the anchors, frame, tide-down cables, and adapters), in order to better adjust the parameter to the changing wavelength, and thereby increase the efficiency of wave energy conversion.

Accordingly, the natural frequency of the system may be changed, e.g. due to regulating of the differential water flow through channel 135 caused by a pressure difference between the outside water body having an intensively oscillating level (w-w), and the inside water bodies confined within holes 174, i.e. being part of the virtual vessels and significantly less affected by the surface waves.

Other embodiments may comprise an expandable and collapsible, for example, telescopic tubular extension (174T), illustrated on FIG. 9, attached to the lower opening of hole 174 situated on the underside of platform 170. Tubular extension 174T, being expanded, may decrease, and being upwardly collapsed, may also increase the natural frequency of the platform-floats system, when it's necessary to adjust it to the changing wavelength.

A control means (not shown in the drawings) may be implemented with platform 170 to process the amounts of amplitude, frequency, and phase of the waves and the platform parameters, such as its instant displacement, the velocity and acceleration of the displacement measured by sensor devices (not shown herein). The sensor devices may be installed, for example, on the platform, or on or inside the floats—especially for the systems not using the IWETs, i.e. without sensor device 136S (see FIG. 8b) or similar—and then, for example, wirely or wirelessly transmitting the measured parameters signals to the control means.

The control means will further output signals regulating the length of expansion or collapsing of extension 174T (executed by a drive means not illustrated in the drawings), as well as output other signals regulating the extent of opening of valves 156, connected with or incorporated into channels 153, and the direction of the differential water flow through channels 153, which will provide the necessary adjustments of the natural frequency of the system, increasing its energy conversion efficiency.

FIG. 9 also partially depicts IWET's elements: two casings (145) with pads (148P), two pushing rods (150) with pistons (1SOP) earlier disclosed herein. It also shows other elements: a part of closure (171), two combined control-electrolysis units (175) with cables (138), connected to the IWETs and a hydrogen duct (181) discussed below.

Other Platform Ramifications.

Other ramifications of the platform may be implemented as well. For example, a platform may comprise (not shown in the drawings) two main parts: a base platform and a peripheral platform disposed around the base platform and fastened to it. The base platform carries all the above-mentioned equipment protected by waterproof means and water ballast tanks, whereas the peripheral platform primarily serves as an additional float means, and carries emergency pumps and, for example, additional IWETs to power the emergency pumps.

During exceptionally strong hurricanes and storms, the base platform may be unfastened from the peripheral platform, and fully or partially submerged into the ocean by inletting water into the water ballast tanks. After the hurricane or strong storm discontinues, the emergency pumps will pump out the water body from the tanks, and the base platform will be lifted upon the ocean surface.

Alternatively to the water ballast tanks, a pull-up-and-down subsystem may be arranged and, possibly, combined with the anchoring subsystem, powered by the IWETs installed on the peripheral platform.

Another embodiment may be appropriate mostly for near-shore WECs. A natural or artificial water reservoir can be used near the shore, created by confining a water body with a generally similar platform (or an array of platforms) with a similar anchoring subsystem. The reservoir should be of sufficient size and depth, and the platform(s) should be of sufficient dimensions, that will essentially create a dyke-like construction (not illustrated) around the reservoir. In the construction, the reservoir itself will serve as a huge additional virtual vessel.

The platform includes substantially horizontal channels similar to channels 153 with valves similar to valves 156. The channels communicate the reservoir with the vertical holes and the outside seawater body. A plurality of freely and vertically reciprocating floats, similar to floats 172, is analogously arranged, and the IWETs are installed on the platform and on the floats in a similar fashion. It is believed that this system may be efficiently usable for very strong storms and hurricanes, since would have a higher capability for adapting (changing its natural frequency) to accord with storm waves.

A Multi-Platform-Based IWECS for Production of Hydrogen from Seawater.

A multi-platform IWECS (MP-IWECS) may be used for production and temporary storage of hydrogen and oxygen from ocean or sea water. The MP-IWECS includes the foregoing IWECSs based on a plurality of platforms, closures joining the platforms, a plurality of exchangeable hydrogen tanks, combined control-electrolysis units, and possibly special stabilization means and a centralized sensor-control system (discussed further). This IWECS embodiment utilizes two-sectional MSL-IWETs, although any suitable aforesaid IWET embodiment may be implemented in the system.

Figure 10:
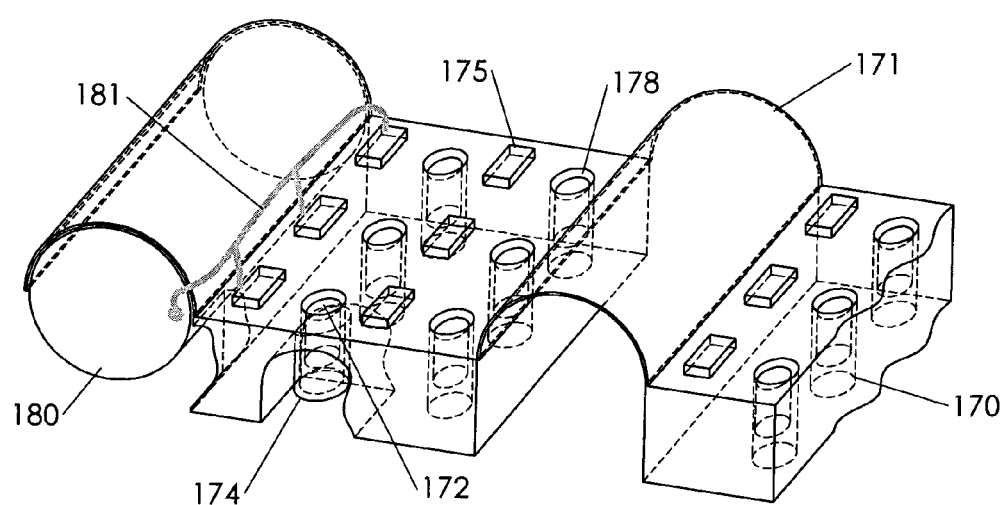
FIG. 10 is a partial isometric view of a multi-platform-based IWECS with freely buoying floats for hydrogen production, according to an embodiment of the present invention.

Referring to FIG. 10, there is shown an isometric view of an embodiment of MP-IWECS comprising a plurality of platforms (170), anchored to an anchoring subsystem, wherein the construction of the platform and the anchoring system is preferably identical to the one described in the previous IWECS embodiment. Each platform 170 includes holes (174) opened from the bottom, and necks (178) made above holes 174. Floats (172) are substantially freely and vertically floating inside holes 174.

FIG. 10 exemplarily depicts a plurality of closures (171) joining the side edges of each two neighboring platforms 170, except the ending edges of the ending platforms. Closure 171 may be made of fabric stretched on a plurality of semi-circular arcs (not shown in the drawings) made of suitable metal or other material with predetermined resilient characteristics, wherein each arc is mounted (preferably detachably) with its first end to one platform, and with its second end to the neighboring platform. Other suitable shapes and materials can be used for constructing of the closure.

Similar (or different types of) closures (not shown in the drawings) may be installed over each platform functioning as a roof and sidewalls. Alternatively, suitable pneumatic constructions may be designed to cover the platform.

Also, the upper outer surface of specially designed closures between and above the platforms can be used to mount solar-electric power panels, which will generate electricity during calm sunny weather when the sea waves are usually small, i.e. the system will have enough power to produce more hydrogen even then. Likewise, wind power generators may be used in combinations with the IWEcs (not shown in the drawings herein). Special means should be arranged to protect the solar panels and wind power generators from high waves during a storm.

The embodiment comprises a plurality of tanks (180) capable to contain hydrogen; one such tank 180 is shown on FIG. 10. It is convenient to use cylindrically shaped tanks 180 and the half-cylindrical shape of closures 171. Tanks 180 may be fastened to platform 170 and/or to closure 171 by appropriate fastening means (not shown in the drawings). FIG. 10 also shows a hydrogen duct (181) for collecting hydrogen gas and delivering it into tank 180.

The MP-IWECS comprises a plurality of combined control-electrolysis units (175), reflected on FIG. 10 in the form of rectangular boxes. Units 175 are schematically illustrated in more detail on FIG. 11. The embodiment of MP-IWECS employs a two-sectional MS-IWET, described herein above, but other embodiments may deploy other types of vertical IWETs (for example, the three-sectional IWETs earlier discussed), and additionally, if necessary, horizontally installed IWETs to utilize the energy of running surface sea waves.

Figure 11:
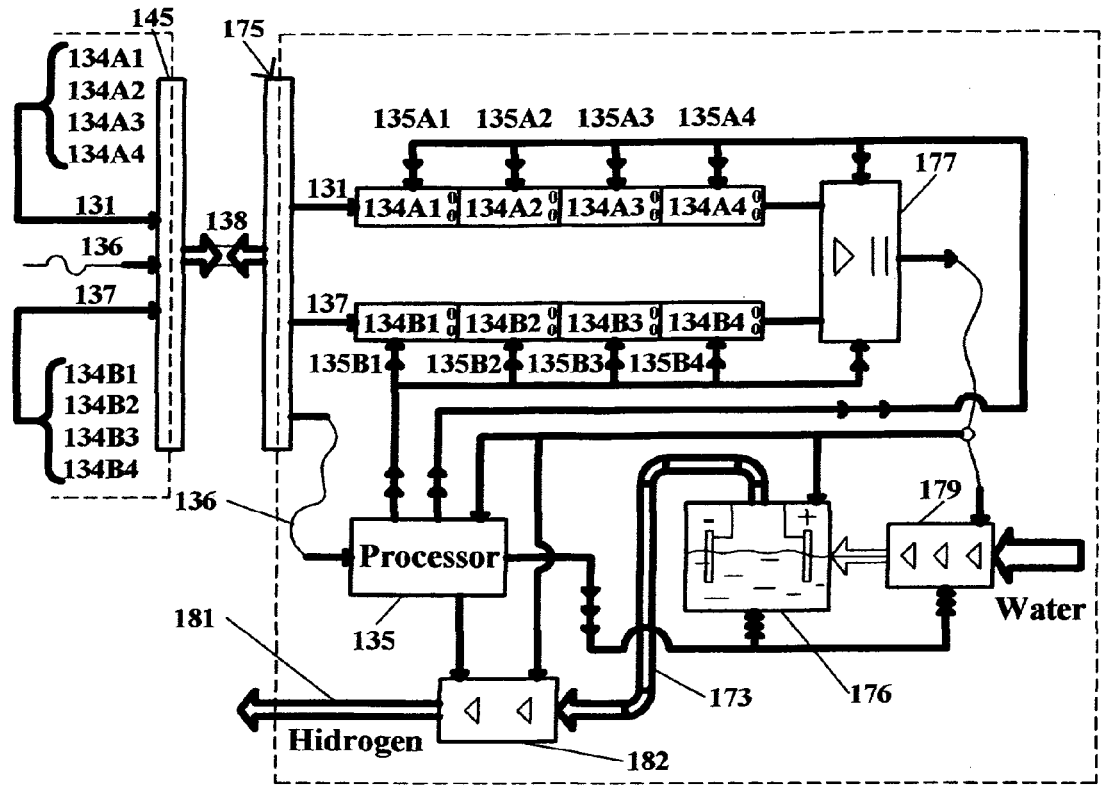
FIG. 11 is a schematic view of a control system, regulating a vertical reciprocating IWET and other platform devices, employed by the IWECS for production of hydrogen from seawater, according to an embodiment of the present invention.

Electrical wire pairs (134A1), (134A2), (134A3), and (134A4), joined in a cable (131), shown on FIG. 8b and on FIG. 11, are connected to the corresponding coils (130A1), (130A2), (130A3), and (130A4) of the MSL-IWET reflected on FIG. 8b.

Electrical wire pairs (134B1), (134B2), (134B3), and (134B4), joined in a cable (137), shown on FIG. 8b and on FIG. 11, are connected to the corresponding coils (130B1), (130B2), (130B3), and (130B4) of the MSL-IWET reflected on FIG. 8b.

A signal cable (136), illustrated on FIG. 8b and on FIG. 11, is connected to a sensor device (136S) shown on FIG. 8b earlier described in the section dedicated to the MSL-IWET.

The MP-IWECS embodiment comprises a plurality of waterproof cables (138), each enclosing cables 131, 137, 136, which cables 138 each connects one MSL-IWET with one unit 175. Other embodiments may have a different schema, such as connecting one unit 175 to a plurality of MSL-IWETs, or vice-versa, with an implementation of control principles following below, or with a different control and electrical load system.

The wires of cable 131 inside unit 175 are connected to terminals corresponding to the markings of the wires: 134A1, 134A2, 134A3, and 134A4, which terminals further wired to a commutator-rectifier (177), further called a CR 177. Likewise, the wires of cable 137 are connected to terminals corresponding to the markings of the wires: 134B1, 134B2, 134B3, and 134B4, which terminals further wired to CR 177.

CR 177 is an electronic device including a circuitry configured to switch off and on (preferably in parallel) a necessary combination of the corresponding coils of the MSL-IWET based on processing commands (135A1), (135A2), (135A3), (135A4), (135B1), (135B2), (135B3), and (135B4), conditionally shown on FIG. 11 by double-arrow lines pointing to a corresponding pair of wires to be switched to CR 177. CR 177 physically receives the processing commands, and connects the switched combination of coils to a conventional rectifier, preferably incorporated in CR 177. Additionally, CR 177 may regulate the amount of electric current in the coils, e.g. by semiconductor devices capable to provide a variable increasing or decreasing the amount, instead of switching it on and off.

The MP-IWECS embodiment comprises a processor unit (135) illustrated on FIG. 11, substantially a computer, particularly configured to receive and process sensor signals, carried by cable 136, from sensor device 136S (shown on FIG. 8b, and described in the two-sectional MSL-IWET embodiment section above). Processor 135 analyses the sensor signals and issues said processing commands 135A1, 135A2, 135A3, 135A4, 135B1, 135B2, 135B3, and 135B4. Processor 135 also receives other measured signals and issues regulative signals for other devices incorporated in unit 175, as disclosed below.

The MP-IWECS embodiment comprises an electrolyzer unit (176) illustrated on FIG. 11. In this embodiment, electrolyzer 176 receives seawater from a water pump (179), which in turn may receive the output water heated up in said heat exchanger described above in the section called "MSL-IWET: Modified Lower And Bottom Compartments With A Heat Exchanger". The inletting water flow may also be heated up by or in combination with another heater means, or electrolyzer 176 may simply use the outside non-heated seawater (not preferable).

As depicted on FIG. 11, the hydrogen gas, produced by the well known electrolysis process in electrolyzer 176, is transferred via a hose (173) to a hydrogen pump (182) compressing the gas, wherefrom the compressed hydrogen gas is output into a hydrogen duct (181). All the above devices: electrolyzer 176, water pump 179, hydrogen pump 182, and processor 135 are powered by CR 177, though there should generally be a reserve electric power source (not shown) that may be needed for launching the system, for wireless emergency or other communications, etc. Processor 135 also receives necessary measured parameters from and issues regulative signals for control of electrolyzer 176, water pump 179, and hydrogen pump 182.

Thus, according to changing parameters sensed and measured by sensor device 136S, and based on a program, processor 135 commutates certain coils of the MSL-IWET (and may optionally regulate the amounts of induced currents by semiconductor or other control circuitry), providing efficient energy conversion, as previously described in the above section "Example of Operation of A Two-Sectional MSL-IWET". Processor 135 also provides for substantially optimal operation modes of the IWECS with respect to the water feeding, electrolysis control, and hydrogen compression.

Apparently, if necessary, the IWECS may be employed to produce oxygen gas, which can be used in devices for chemical or other processes, including installations mounted on the platform. Likewise, installations for liquefaction of hydrogen and oxygen might be placed on the platform, or may be mounted on special hydrogen-collector ships, wherein the gaseous hydrogen (and perhaps oxygen) will be transformed into the liquid phase. Another option may be to arrange pipelines from the platforms to an on-shore station receiving the gaseous hydrogen, for instance, to further liquefy it. Yet another option is to furnish the platform with engines (e.g. using hydrogen in fuel cells for driving electrical motors, or as a fuel for internal combustion or other engines), so that the mobilized platform may transport the hydrogen tanks to a processing station.

An Inertial Water Stabilizer-Generator (IWSG) for the IWECS Platform.

The prior art references above and many others teach various technological solutions to absorb shocks caused by excessively powerful sea waves to protect WECs. As already noticed herein, most of them are focused on dissipation of the excessive wave energy, and only a few are concerned with utilization of this excessive energy. For platform-based wave energy converters there is however another issue: how to stabilize the platform during a storm with such excessive sea waves.

According to the present invention, this issue is addressed in the device called an inertial water stabilizer-generator (IWSG), which utilizes the excessive motion energy of the waves for stabilizing the platform during a storm, at least partially accumulates the excessive motion energy, and, generally at a later stage, releases the accumulated energy converting it into electric power.

Figure 12B:
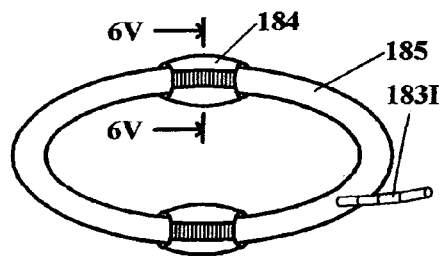
Figure 12A:
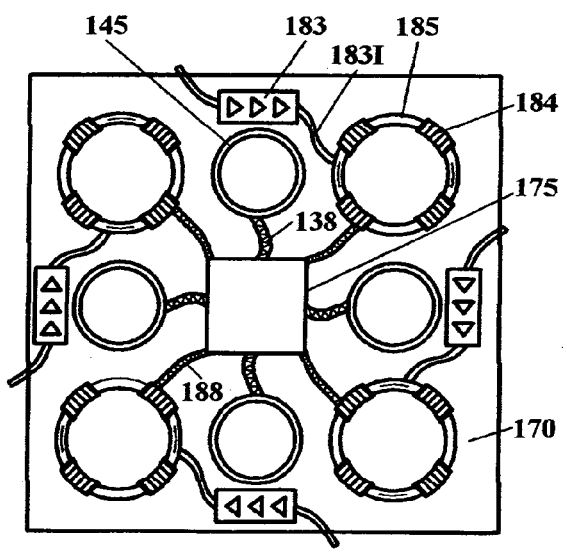
FIG. 12a is a partial plan view a platform-based IWEC with an inertial water stabilizer-generator (IWSG), according to an embodiment of the present invention.

FIG. 12a illustrates a plan view of a squared-shaped platform (170), similar to the previously described platform of MP-IWECS with four IWETs mounted thereon, represented by their casings (145).

FIG. 12a shows four IWSGs located in the corner regions of platform 170. Each IWSG comprises a rigid hollow toroid chamber (1 85), also depicted in more detail on an isometric view of FIG. 12b.

There is a number of magnetohydrodynamic units (184), further called MHDU 184, installed on chambers 185. Only two MHDUs 184 are shown on FIG. 12b, and four MHDUs 184 are indicated on each of said four chambers 185 on FIG. 12a. As reflected on FIG. 12c (a cross-sectional view 6V-6V), an MHDU 184 comprises a cover (184C) enclosing magnets (184M) disposed outside chamber 185, and electrodes (184E) disposed, preferably, inside chamber 185, providing electrical contact with the inside water body. MHDU 184 embraces a portion of chamber 185.

Electrodes 184E are controllably connected to an electric load, or (upon being switched) to an electric power source producing a predetermined electromotive force between the positive and negative electrodes 184E.

Magnets 184M may be permanent magnets (preferably of a rare earth magnetic material) or electromagnets. A pair of magnets 184M should produce a magnetic flux of a predetermined amount in the portion of chamber 185, embraced by the pair of magnets.

Figure 12C:
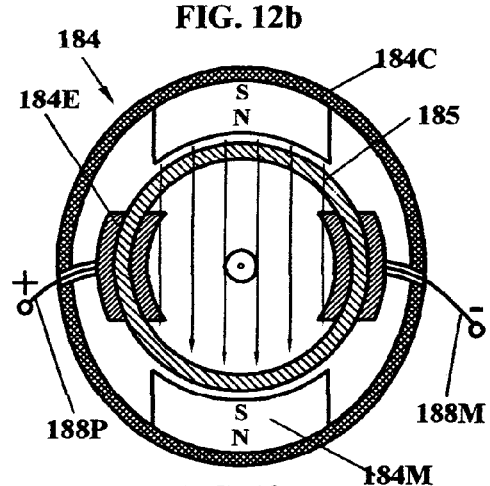

The central symmetrical axis of magnets 184M and electrodes 184E are positioned in general perpendicularly each other, so that their magnetic and electrical fields have perpendicular lines of force (the magnetic lines are shown on FIG. 12c). Electrodes 184E are connected to wires (188P) for each positive electrode terminal, and wires (188N) for each negative terminal. Wires 188P and 188N of all MHDUs installed on one chamber 185 are respectively connected in parallel.

This embodiment of IWECS comprises a combined control-electrolyzer unit (175) described in the foregoing multi-platform-based embodiment of IWECS, disposed in the center of platform 170. Unit 175 is connected to the IWETs casings 145 by cables (138) shown on FIG. 12a, and described in the above IWECS embodiment. MHDUs 184 are connected to unit 175 by waterproof cables (188) shown on FIG. 12a Each cable 188 encloses said wires 188P and 188N (depicted on FIG. 12c) from all corresponding MHDU terminals of one IWSG.

A plurality of water pumps (183) is mounted on platform 170, which water pumps 183 each is connected to each chamber 185 by an injecting hose (1831), illustrated on FIG. 12a, 12b. Injecting hose 1831 is disposed at a predetermined angle, substantially tangentially to a radius of toroid chamber 185.

The exemplary wave energy converter embodiment including the inertial water stabilizer-generator, i.e. IWSG illustrated on FIG. 12a, 12b, 12c, generally operates as follows: at the beginning of a storm, when sea wave amplitudes increase, the IWETs, mounted on platform 170, start to generate additional electric power, which may be utilized to actuate water pumps 183, which will pump seawater into chambers 185 through injecting hoses 183L causing the water body inside chamber 185 to rotate circumferentially along the chamber.

A portion of the rotating water body's energy will be spent for overcoming the friction between the water body and the walls of chamber 185, which portion can be reduced by making the inner chamber walls more precise, and by using special surface active substances (known to a skilled artisan) to reduce the friction. In order to compensate the remaining energy losses, water pump 183 should operate periodically, when the velocity of the rotating water body (measured by a suitable sensor, not shown; or the induced voltage on electrodes 184E may be measured by MHDU 184, which is proportional to the velocity) is decreasing lower than a predetermined level. An outlet (not shown) may be used to remove excessive amount of slowly rotating water, and then water pump 183 should be switched on. When the water body's velocity increases to a predetermined amount, water pump 183 should be switched off.

As known, a rotating body possesses a rotational type of inertia, which for a long time is used in a gyroscope, capable to keep its direction of rotational axis substantially unchanged while its frame is subject to movements, impacts, and vibrations. The gyroscopic effect of a rotating water body in chambers 185 may be used to stabilize the position of platform 170 approximate to a substantially horizontal position during storm waves, since the water body inside chambers 185 will tend to rotate in a substantially horizontal plane in this embodiment. The greater the mass of the rotational water body and the velocity of rotation are, the more significant stabilizing effect will be.

It is also possible to construct IWSG embodiments for stabilizing the platform in a vertical or another direction. In order to avoid spinning of platform 170 itself, the rotational directions of the water bodies in any two neighboring chambers should be opposite (i.e. clockwise-counterclockwise), e.g. as shown on FIG. 12a In a case of misbalance, some of water pumps 183, being controllably regulated, should increase their pressure, and the others should reduce it to cease the undesirable spinning.

When the storm is over, and there is no need to stabilize platform 170 anymore, the energy accumulated by the rotating water bodies of all the chambers may be converted into electric power either by actuating of an impeller means revolving a shaft of a rotational electrical generator (not shown), or otherwise.

As disclosed above, the magnetohydrodynamic generator embodiment on FIGS. 12a, 12b, and 12c is exemplarily chosen for this purpose. It may be used as an MHD engine (in a water-moving mode) during a storm, when the excessive energy generated by the MSL-IWETs, mounted on the platform, can be particularly used to create the electric field between electrodes 184E (and perhaps magnetic field, if electromagnets are deployed as magnets 184M). The magnetic and electric fields will accelerate the moving conductive seawater, i.e. impart more excessive energy into the rotating water body in addition to (or even instead of) the injections of water pump 183.

The magnetohydrodynamic generators are especially useful when the storm calms down, and the energy of the rotating water bodies inside chambers 185 can be converted into electric power, since the platform does not generally need the stabilization during normal weather conditions. Electrodes 184E should then be switched so that the EMF, generated on them due to the motion of the conductive water through the perpendicular magnetic field created by magnets 184M (in an electricity generation mode), will power an electric load (electrolyzers or anything else), i.e. the energy will be recuperated and utilized.

The magnetohydrodynamic generator may also be usable for heating up seawater before inletting it into the electrolyzers, as already mentioned hereinbefore. For example, in the water-moving mode, the rotating water body inside chamber 185 may additionally be accelerated by the MHDU, and the electric current flowing between electrodes 184E will also heat up the water body. A portion of the heated water body may be directed through aforesaid outlet (not shown in the drawings) from chamber 185, via water pump 179 to electrolyzer 176 (both shown on FIG. 11). Another option is the use of electrodes 184E directly (with immovable water) for heating up the seawater for further input into the electrolyzers.

FIG. 12a shows combined control-electrolyzer unit 175 connected to MHDUs 184 to utilize their electric power produced in the electricity generation mode for electrolysis. However, this or other embodiments of IWECS including IWSG (which sometimes might not include hydrogen production) should comprise different control means for handling all the control actions applicable to IWSG, described hereinabove.

For example, a control unit (not shown) and sensor devices (not shown) should be installed on the platform. The sensor devices measure parameters including the instant amplitude (and maybe the frequency) of the waves, the position of the platform relative to the horizontal plane (gyroscopic devices can be used for this purpose), its deviation, and, and convert the parameters into measure signals. The control unit receives and processes the measure signals.

Additionally, the control unit receives and processes signals from the MHDUs, e.g. the voltage on electrodes 184E proportional to the velocity of rotating water inside chambers 185 (the voltage may be measured in the electric power generating mode without an electrical load connected to the MHDU), and the amount of electric current output (when an electrical load is connected). When these wave and MHDU parameters reach predetermined levels, the control unit issues regulative signals to turn on or off water pumps 183, to switch the operative modes of MHDU 184 (water moving or power generating), etc.

The Control Issue and Effectiveness of the Platform-Based IWECS.

As already noticed, the effectiveness of electric power generation is closely related to the difference between the compelling wave frequency and the natural frequency of the WEC system. The natural frequency of a simple ("ideal", i.e. without energy losses) oscillating system generally inversely depends upon a square root of the system's mass, and proportionally depends on the square root of the system's rigidity (an internal property of the system). Therefore, a variable added mass will be able to change the natural frequency as well.

The above disclosed "IWECS With Freely Buoying Floats" may alter its natural frequency, by changing the height of aforesaid "virtual vessels" (and therefore the added mass) with special telescopic extensions attached to the bottom of the virtual vessel, and/or by regulating a differential flow of seawater between any pair of the virtual vessels and between the virtual vessels and the surrounding water body, thereby changing the "flexibility" (an inverse characteristic to the "rigidity") of the oscillating system.

All the above-mentioned IWETs during their operation, in general based on electromagnetic induction, might also alter the natural frequency of the platform-floats system they are coupled with. For instance, variations of the number and generated electric power of inducing IWET coils (switched on) on the platform will change the internal properties of the oscillating system, since it increases the absorbed (consumed by the electrical load) energy of the oscillations (i.e. damps the oscillations), and thereby increases the time period of the oscillations (and therefore reduces their frequency).

Thus, it is important and beneficial to establish a control system capable to measure the instant sea wave parameters (amplitude, frequency, phase), the system internal parameters (such as displacement of the IWET inductors in relation to the armatures, the velocity of the displacement, the acceleration of each IWET, the height and differential flows between neighboring virtual vessels, etc.) in order to operatively, dynamically, and optimally adapt the system to resemble the "wave situation".

A system state close to a resonance may be achieved by controllably regulating all the above mentioned system parameters, in which state, the IWECS will generate maximum electric power. In cases of excessively powered waves, there might be an opposite necessity to bring the system to a state possibly far from the resonance, which may be done by changing the added mass, the flexibility, and the damping capability by aforesaid measures. Factually, the control system determines the way of IWETs and IWECs operation and enables them to achieve high efficiency, according to the present invention.

For example, a central processing unit (not shown herein) may be arranged to receive sensor signals from all the IWETs installed on the IWECS, and sensor devices installed on the virtual vessels (not illustrated), etc., and dynamically control processors 135 of each unit 175 (FIG. 11), IWSG control units, and all other aforementioned control means. If necessary, the control system will dynamically configure the control circuits of valves 156, IWET coils 130, tidal adapters 155, hydrogen (and perhaps oxygen) pressure regulators, pumps, emergency subsystems, communication systems, MHDUs, solar and wind generation devices (if any), and other executive devices of the IWECS. Different conventionally known and new optimization algorithms can be used for these purposes.

I claim:

1. A device for transforming outer intermittent forces energy into electric power especially usable for sea wave energy conversion, comprising at least one section including:

an inductor means for providing a changing magnetic flux within a predetermined space, said inductor means comprising a plurality of substantially identical permanent magnets equably distant from each other, mounted on at least one inductor core capable to conduct said magnetic flux, each two neighboring magnets so positioned that coupled with said at least one inductor core in the opposite magnetic polarity;

an armature means for inducing electric current in response to the changing magnetic flux within the predetermined space and comprising at least one armature core, capable to conduct said magnetic flux, said at least one armature core including a plurality of teeth, with a predetermined length equal for all the teeth, equably distant from each other, a plurality of electro-conductive coils with a predetermined length equal for all the coils, wound on said at least one armature core so that each said coil positioned between any two neighboring teeth, the sum of the lengths of one of said teeth and one said coil constituting an armature step;

the number of the magnets capable to be substantially fully placed within the armature step length equal to an odd number; and said inductor means capable to be engaged in a movement relatively to said armature means along a direction.

2. A device for transforming outer intermittent forces energy, caused by sea waves, into electric power, comprising at least one section including:

an inductor means for providing a changing magnetic flux within a predetermined space, said inductor means comprising a plurality of substantially identical permanent magnets equably distant from each other, mounted on at least one inductor core capable to conduct said magnetic flux, each two neighboring magnets so positioned that coupled with said at least one inductor core in the opposite magnetic polarity;

an armature means for inducing electric current in response to the changing magnetic flux within the predetermined space and comprising at least one armature core, capable to conduct said magnetic flux, said at least one armature core including a plurality of teeth, with a predetermined length equal for all the teeth, equably distant from each other, a plurality of electro-conductive coils with a predetermined length equal for all the coils, wound on said at least one armature core so that each said coil positioned between any two neighboring teeth, the sum of the lengths of one of said teeth and one said coil constituting an armature step;

the number of the magnets capable to be substantially fully placed within the armature step length equal to an odd number; and an impelling means actuated by said intermittent forces of sea waves, said impelling means substantially associated either with said inductor means or said armature means and capable to provide a movement of said inductor means relative to said armature means alone a direction.

3. The device according to claim 2, wherein said at least one armature core and said at least one inductor core essentially forming an assembly pair type, said pair type being selected from the group consisting of (A) a linear assembly, wherein said at least one armature core and at least one inductor core shaped as linear bodies, elongated in said direction;

(B) an annular assembly, wherein said at least one armature core and at least one inductor core shaped as an annular body; and (C) a pendulum assembly, wherein said at least one armature core and at least one inductor core shaped as annular segment bodies.

4. The device according to claim 3, wherein said at least one armature core and said at least one inductor core essentially forming a pair of the annular assembly type;

said at least one armature core shaped as an annular body, whereas said at least one inductor core shaped as an annular segment body;

said inductor means capable to carry out said movement in the form of revolving about an axle;

said magnets substantially equidistantly disposed on said at least one inductor core, except the ending magnets having a distance therebetween greater than the distance between the other non-ending magnets;

at least one of the following arranged (a) at least a portion of said plurality of teeth made of different heights, and the height of the teeth of the portion increasing toward the direction of said revolving, (b) at least a portion of said plurality of coils made of wires with different cross-section areas, and the areas increasing in the coils disposed toward the direction of said revolving, (c) at least a portion of said plurality of coils made with a different number of wire turns, and the number increasing in the coils disposed toward the direction of said revolving; and said device further comprising control means configured to switch on and off any combination of said plurality of coils, or to regulate the amounts of induced electric currents in the plurality of coils, depending on at least parameters of the outer forces and parameters of said revolving movement to provide a higher efficiency of the energy conversion.

5. The device according to claim 3, further comprising at least two sections, wherein each section including said at least one armature core and said at least one inductor core essentially forming a pair of the linear assembly type;

said at least one inductor means capable to carry out said movement in the form of linear reciprocating movement;

at least one of the following arranged (a) at least a portion of said plurality of teeth made of different heights, and the height of the teeth of the portion increasing towards a forward and a backward directions of said linear movement;

(b) at least a portion of said plurality of coils made of wires with different cross-section areas, and the areas increasing in the coils disposed towards a forward and a backward directions of said linear movement, (c) at least a portion of said plurality of coils made with a different number of wire turns, and the number increasing in the coils disposed towards a forward and a backward directions of said linear movement; and said at least two sections differed from each other in that at least a portion of said plurality of coils, pertaining to a particular section, made of wires with a cross-section area significantly different from a cross-section area of wires pertaining to another section; and said device further comprising control means configured to switch on and off any combination of said plurality of coils of said at least two sections, or to regulate the amounts of induced electric currents in the plurality of coils, depending on at least parameters of the outer forces and parameters of said linear reciprocating movement to provide a higher efficiency of the energy conversion.

6. The device according to claim 5, further comprising at least one resilient means for damping excessive said outer forces in a forward direction, and facilitating the linear reciprocating movement in the backward direction, or vice-versa, wherein said at least one resilient means comprising at least one of the following:

(a) at least one pair of permanent magnets positioned in the opposite polarity to each other and a first magnet of said at least one pair coupled with the armature means and the other magnet of said at least one pair coupled with the inductor means, so that said at least one pair forming a predetermined repulsive magnetic field;

(b) at least one spring member with predetermined characteristics, a first end of said at least one spring member coupled with the armature means, and the other end of said at least one spring member coupled with the inductor means;

(c) at least one hydraulic shock absorbing device adaptively placed between the inductor means and the armature means;

(d) at least one pneumatic shock absorbing device adaptively placed between the inductor means and the armature means.

7. The device according to claim 3, wherein said at least one armature core and said at least one inductor core essentially forming a pair of the linear assembly type;

said inductor means capable to carry out said movement in the form of linear reciprocating movement;

and the device further comprising cooling means including cooling pockets arranged in the vicinities of said plurality of coils;

a first cylindrical compartment;

a piston of a sombrero-like shape having cylindrical sidewalls, a bottom, an opening, and a flat ring, the edge of the opening continuously coupled with an inner edge of the flat ring, whereas an outer edge of the flat ring snug-fitting within the cylindrical sidewalls of the first compartment, the piston attached essentially to said inductor means and participating in said linear reciprocating movement, the piston made of materials with a predeterminedly high heat conductivity, the piston substantially dividing the first compartment into a primary cooling portion and a secondary cooling portion, the primary portion fillable with a primary cooling liquid, the secondary portion fillable with a secondary cooling liquid, the primary and secondary portions capable to inversely change their volumes following said linear reciprocating movement of the piston;

at least one valve capable to regulate the primary cooling liquid flow from the primary portion of the first compartment to the cooling pockets;

at least one valve, capable to regulate the primary cooling liquid flow from the cooling pockets to the primary portion of the first compartment;

a second compartment fillable with a secondary cooling liquid;

at least one valve capable to regulate the secondary cooling liquid flow from the second compartment to the secondary portion of the first compartment;

at least one valve, capable to regulate the secondary cooling liquid flow from the secondary portion of the first compartment to the second compartment;

an inlet means for input of the secondary cooling liquid into the second compartment;

an outlet means for output of the secondary cooling liquid from the second compartment.

8. The device according to claim 7, wherein
the secondary cooling liquid being seawater, and the seawater output from the outlet means further used in an electrolysis process to produce hydrogen and oxygen.

9. The device according to claim 3, wherein
said impelling means capable of being engaged in a substantially linear reciprocating motions; and said device further comprising
movement translating means for transforming said linear reciprocating motion into a rotational or swinging movement of said inductor means relatively to said armature means.

10. The device according to claim 3, wherein
said impelling means capable of being engaged in a substantially reciprocating motion; and said device further comprising
movement translating means for transforming said reciprocating motion into a rotational or swinging movement of said inductor means relatively to said armature means.

11. The device according to claim 2,
further comprising a substantially cylindrical casing; wherein said at least one armature core including at least two longitudinal armature cores axially and circumferentially disposed in said casing;

said plurality of teeth arranged in at least two rows each coupled to said at least two longitudinal armature cores;

said at least one inductor core substantially shaped as a cylinder having a through internal substantially cylindrical channel along its axial direction, said at least one inductor core disposed within said at least two armature core;

said plurality of permanent magnets mounted peripherally around and longitudinally along said at least one inductor core forming at least two rows of the magnets, so that a predetermined gap provided between the tops of the magnets and the tops of the teeth;

an internal substantially cylindrical rod fixedly insertable into the internal cylindrical channel of the inductor core; and said rod associated with said impelling means and capable to carry out said movement in the form of linear reciprocating motion.

12. The device according to claim 11, further comprising at least two sections, wherein for each section at least one of the following arranged:

(a) at least a portion of said plurality of teeth made of different heights, and the height of the teeth of the portion increasing towards a forward and a backward directions of said linear movement;

(b) at least a portion of said plurality of coils made of wires with different cross-section areas, and the areas increasing in the coils disposed towards a forward and a backward directions of said linear movement, (c) at least a portion of said plurality of coils made with a different number of wire turns, and the number increasing in the coils disposed towards a forward and a backward directions of said linear movement; and said at least two sections differed from each other in that at least a portion of said plurality of coils, pertaining to a particular section, made of wires with a cross-section area significantly different from a cross-section area of wires pertaining to another section; and said device further comprising control means configured to switch on and off any combination of said plurality of coils of said at least two sections, or to regulate the amounts of induced electric currents in the plurality of coils, depending on at least parameters of the outer forces and parameters of said linear reciprocating movement to provide a higher efficiency of the energy conversion.

\* \* \* \* \*